(12) United States Patent
Kazmi et al.

(10) Patent No.: US 9,603,008 B2
(45) Date of Patent: Mar. 21, 2017

(54) METHODS AND NETWORK NODES FOR HANDLING INFORMATION ASSOCIATED WITH ONE OR MORE UMTS CELLS

(71) Applicant: Telefonaktiebolaget L M Ericsson (publ), Stockholm (SE)

(72) Inventors: Muhammad Kazmi, Bromma (SE); Martin Israelsson, Spånga (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 428 days.

(21) Appl. No.: 14/375,756

(22) PCT Filed: Apr. 3, 2014

(86) PCT No.: PCT/SE2014/050405
§ 371 (c)(1),
(2) Date: Jul. 30, 2014

(87) PCT Pub. No.: WO2014/163569
PCT Pub. Date: Oct. 9, 2014

(65) Prior Publication Data
US 2015/0208230 A1   Jul. 23, 2015

Related U.S. Application Data

(60) Provisional application No. 61/808,986, filed on Apr. 5, 2013.

(51) Int. Cl.
*G01R 31/08* (2006.01)
*G06F 11/00* (2006.01)
(Continued)

(52) U.S. Cl.
CPC .............. *H04W 8/24* (2013.01); *H04B 7/264* (2013.01); *H04W 24/10* (2013.01)

(58) Field of Classification Search
CPC ........................................................ H04W 8/24
See application file for complete search history.

(56) References Cited

U.S. PATENT DOCUMENTS

2003/0156564 A1    8/2003  Frerking et al.
2006/0194580 A1*   8/2006  Gruber ................. H04W 36/14
                                                          455/436
(Continued)

OTHER PUBLICATIONS

3GPP TSG-RAN WG4 Meeting #66bis, Chicago, United States of America, Apr. 15-19, 2013; R4-131655; Renesas Mobile Europe Ltd., "Discussion on Scalable UMTS", 20 pages.
(Continued)

*Primary Examiner* — Gerald Smarth
(74) *Attorney, Agent, or Firm* — Myers Bigel, P.A.

(57) ABSTRACT

Handling of information associated with one or more Universal Mobile Telecommunications System, "UMTS", cells. A first network node is comprised in a cellular communication system. The first network node obtains first chip rate information being information associated with at least one chip rate with which radio signals are operable in said one or more UMTS cells. The first network node sends second chip rate information to another, second network node comprised in the cellular communications system. The second chip rate information is based on the obtained first chip rate information.

50 Claims, 5 Drawing Sheets

(51) Int. Cl.
*H04W 8/24* (2009.01)
*H04B 7/26* (2006.01)
*H04W 24/10* (2009.01)

(56) References Cited

U.S. PATENT DOCUMENTS

2011/0188478 A1* 8/2011 Elezabi ............... H04B 7/216
370/335
2011/0299507 A1 12/2011 Beale
2013/0115967 A1* 5/2013 Soliman ............... H04W 16/02
455/452.1

OTHER PUBLICATIONS

International Search Report and Written Opinion Corresponding to International Application No. PCT/SE2014/050405; Date of Mailing: Jul. 10, 2014; 12 Pages.
China UNICOM: "New SID proposal: Scalable UMTS", 3GPP™ Work Item Description see 3GPP Working Procedures, article 39; Agenda Item: 13.2; 3GPP TSG RAN Meeting #58, Barcelona, Spain, Dec. 4-7, 2012, RP-122017; 5 pages.

* cited by examiner

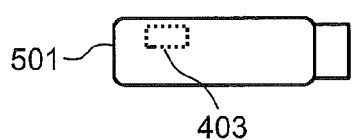
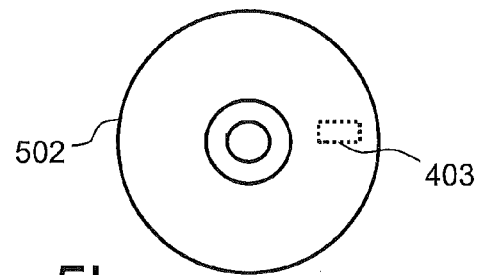
Fig. 5a    Fig. 5b
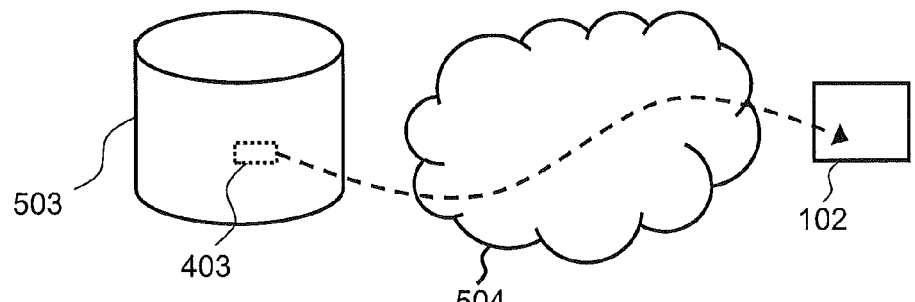
Fig. 5c
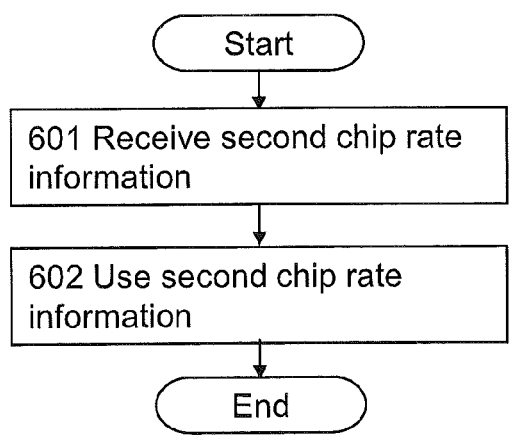
Fig. 6

METHODS AND NETWORK NODES FOR HANDLING INFORMATION ASSOCIATED WITH ONE OR MORE UMTS CELLS

CROSS-REFERENCE TO RELATED APPLICATION

This application is a 35 U.S.C. §371 national stage application of PCT International Application No. PCT/SE2014/050405, filed in English on 3 Apr. 2014, which itself claims the benefit of U.S. provisional Patent Application No. 61/808,986, filed 5 Apr. 2013, the disclosures and contents of both of which are incorporated by reference herein in their entirety.

TECHNICAL FIELD

Embodiments herein relate to methods and network nodes comprised in a cellular communication system, such as a telecommunications system. In particular embodiments herein relate to handling information associated with one or more Universal Mobile Telecommunications System, "UMTS", cells.

BACKGROUND

Communication devices such as wireless devices are also known as e.g. User Equipments (UEs), mobile terminals, wireless terminals and mobile stations. Wireless devices are enabled to communicate wirelessly in a cellular communication network, wireless communication network or wireless communications system, sometimes also referred to as a cellular radio system or a cellular network. The communication may be performed, e.g., between two wireless devices, between a wireless device and a regular telephone and/or between a wireless device and a server via a Radio Access Network (RAN), and possibly one or more core networks, comprised within the cellular communication network.

Wireless devices may further be referred to as mobile telephones, cellular telephones, laptops, or tablet computer with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another terminal or a server.

The cellular communication network covers a geographical area which is divided into cell areas, wherein each cell area being served by an access node such as a base station (BS), e.g., a Radio Base Station (RBS), which sometimes may be referred to as e.g. "evolved Node B", "eNB", "eNodeB", "NodeB", "B node", "node B" or BTS (Base Transceiver Station), depending on the technology and terminology used. The base stations may be of different classes such as, e.g., macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations.

In some RANs, several base stations may be connected, e.g. by landlines or microwave, to a radio network controller, e.g. a Radio Network Controller (RNC) in Universal Mobile Telecommunications System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communications (originally: Groupe Spécial Mobile). In 3rd Generation Partnership Project (3GPP) Long Term Evolution (LTE), base stations, which may be referred to as eNodeBs, eNBs or even NBs, may be directly connected to other base stations and may be directly connected to one or more core networks.

The 3GPP LTE radio access standard has been written in order to support high bitrates and low latency both for uplink and downlink traffic. All data transmission is in LTE are controlled by the base stations.

UMTS is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for wireless devices. High Speed Packet Access (HSPA) is an amalgamation of two mobile telephony protocols, High Speed Downlink Packet Access (HSDPA) and High Speed Uplink Packet Access (HSUPA), defined by 3GPP, that extends and improves the performance of existing 3rd generation mobile telecommunication networks utilizing the WCDMA. Moreover, the 3GPP has undertaken to evolve further the UTRAN and GSM based radio access network technologies, for example into evolved UTRAN (E-UTRAN) used in LTE.

In the context of this disclosure, the expression Downlink (DL) may be used for the transmission path, or send direction, from a base station to a mobile station. The expression Uplink (UL) may be used for the transmission path, or send direction, in the opposite direction, i.e. from a mobile station to a base station.

In UMTS Frequency Division Duplex (FDD) (also known as WCDMA, Universal Terrestrial Radio Access (UTRA) FDD, HSPA FDD), only 5 MHz channel bandwidth (BW) has been defined. This means that all carriers and all cells on a carrier operate over a 5 MHz bandwidth. The chip rate is also the same for all carriers and all cells i.e. 3.84 Mega chips per second (Mcps). However, in some cases the available frequency resources owned by operators cannot accommodate a 5 MHz UMTS FDD. The use of 5 MHz in such cases may also result in suboptimal spectrum usage, e.g. if the allocated channel bandwidth is larger than 5 MHz. On the other hand, the 5 MHz channel cannot be used for operating UTRA FDD over smaller bandwidths, e.g. 3 MHz.

To allow for a more efficient spectrum allocation and usage for UMTS FDD, the concept of scalable channel bandwidth is being studied in 3GPP. Support of scalable bandwidths will enable UMTS FDD in constrained spectrum scenarios where the available contiguous spectrum is less than 5 MHz or not a multiple of 5 MHz, either as standalone single-carrier UMTS FDD or as multi-carrier UMTS FDD.

Typical examples of scalable channel bandwidths for scalable UMTS operations are 7.5 MHz, 2.5 MHz, 1.25 MHz, 0.6125 MHz etc. The time scale of the signal transmitted on a scalable bandwidth needs to be adapted. More specifically it is scaled compared to that of the signal transmitted on the reference BW (i.e. 5 MHz legacy channel BW). This is achieved by proportionally scaling the chip rate. Therefore the chip rates for channel BWs of 7.5 MHz, 2.5 MHz, 1.25 MHz, 0.6125 MHz would be 5.74 Mcps, 1.92 Mcps, 0.96 Mcps and 0.48 Mcps respectively. In other words the corresponding scaling factors (K) to scale the chip rates with respect to the reference chip rate (i.e. legacy 3.84 Mcps) are 3/2, 1/2, 1/4 and 1/8 for 5.74 Mcps, 1.92 Mcps, 0.96 Mcps and 0.48 Mcps respectively.

In CDMA, the information rate of the signal transmitted on a channel depends upon the symbol rate, which in turn is derived from the chip rate and the spreading factor (SF). In S-UMTS the spreading factor a particular physical channel is expected to remain the same as in legacy UMTS (i.e. 3.84 Mcps). This means the information rate will reduce if S-UMTS channel BW is smaller than the legacy 5 MHz. In other words the same amount of information is transmitted over longer time period. For example for K=½ (i.e. 2.5 MHz) the HSDPA TTI will be increased from 2 ms to 4 ms assuming the same SF as in the legacy 5 MHz UMTS.

In UTRA FDD, the same chip rate (3.84 Mcps) is used in all cells on the same carrier and also on all carriers. In scalable UMTS (S-UMTS), the UTRA FDD will operate with different chip rates e.g. 3.84 Mcps, 1.28 Mcps etc. In UTRA Time Division Duplex (TDD), different chip rates are supported on different carriers.

In a S-UMTS deployment scenario, with different bandwidths of UMTS cells, more and new information about the UMTS cells has to be managed. This should be done in way that is compatible with existing UMTS solutions, and in a manner that is compatible and work with already existing UMTS functionality and services, which may already be in use by operators and/or end users. Without this, S-UMTS deployment may in practice be difficult or even impossible.

SUMMARY

In view of the above, an object of embodiments herein is to provide improvements with regard to handling information associated with one or more UMTS cells to facilitate S-UMTS deployment.

According to a first aspect of embodiments herein, the object is achieved by a method, performed by a first network node, for handling information associated with one or more Universal Mobile Telecommunications System (UMTS) cells. The first network node is comprised in a cellular communication system. The first network node obtains first chip rate information being information associated with at least one chip rate with which radio signals are operable in said one or more UMTS cells. The first network node sends second chip rate information to another, second network node comprised in the cellular communications system. The second chip rate information is based on the obtained first chip rate information.

According to a second aspect of embodiments herein, the object is achieved by a computer program comprising instructions that when executed by a processing circuit causes the first network node to perform the method according to the first aspect.

According to a third aspect of embodiments herein, the object is achieved by a computer program product comprising a computer-readable medium storing the computer program according to the second aspect.

According to a fourth aspect of embodiments herein, the object is achieved by a method, performed by a second network node, for handling information associated with one or more UMTS cells. The second network node is comprised in a cellular communication system. The second network node receives second chip rate information from another, first network node comprised in the cellular communications system. The second chip rate information is based on first chip rate information being information associated with at least one chip rate with which radio signals are operable in said one or more UMTS cells. The second network node uses the received second chip rate information.

According to a fifth aspect of embodiments herein, the object is achieved by a computer program comprising instructions that when executed by a processing circuit causes the second network node to perform the method according to the fourth aspect.

According to a sixth aspect of embodiments herein, the object is achieved by a computer program product comprising a computer-readable medium storing the computer program according to the fifth aspect.

According to a seventh aspect of embodiments herein, the object is achieved by a first network node for handling information associated with one or more UMTS cells. The first network node is comprised in a cellular communication system. The first network node is configured to obtain first chip rate information being information associated with at least one chip rate with which radio signals are operable in said one or more UMTS cells. The first network node is further configured to send second chip rate information to another, second network node comprised in the cellular communications system. The second chip rate information is based on the obtained first chip rate information.

According to an eighth aspect of embodiments herein, the object is achieved by a second network node for handling information associated with one or more UMTS cells. The second network node is comprised in a cellular communication system. The second network node is configured to receive second chip rate information from another, first network node comprised in the cellular communications system. The second chip rate information is based on first chip rate information being information associated with at least one chip rate with which radio signals are operable in said one or more UMTS cells. The second network node is further configured to use the received second chip rate information.

Embodiments herein support, network nodes, e.g. the first network node and/or the second network node, in becoming aware of chip rate(s) used in different cells, e.g. another cell or cells than associated with these network nodes. This is of particular interest for scalable UMTS (S-UMTS) deployment, e.g. when said one or more UMTS cells are S-UMTS cells. Implementation of S-UMTS in the cellular communication system becomes more useful and versatile through embodiments herein. Embodiments herein also support efficient signaling of chip rate information. For example, obtaining the first chip rate information in the first network node and send second chip rate information, based on the first chip rate information, to the second network node, means that different chip rates, e.g. associated with, potentially many, different UMTS cells and/or different nodes, may be handled and sent together and need not be individually and/or explicitly signaled.

BRIEF DESCRIPTION OF THE DRAWINGS

Examples of embodiments herein are described in more detail with reference to the appended schematic drawings.

FIGS. 5a-c are schematic drawings illustrating embodiments relating to a computer program.

FIG. 6 is a flow chart schematically illustrating embodiments of a method, performed by a second network node, according to embodiments herein.

DETAILED DESCRIPTION

Figure 1:
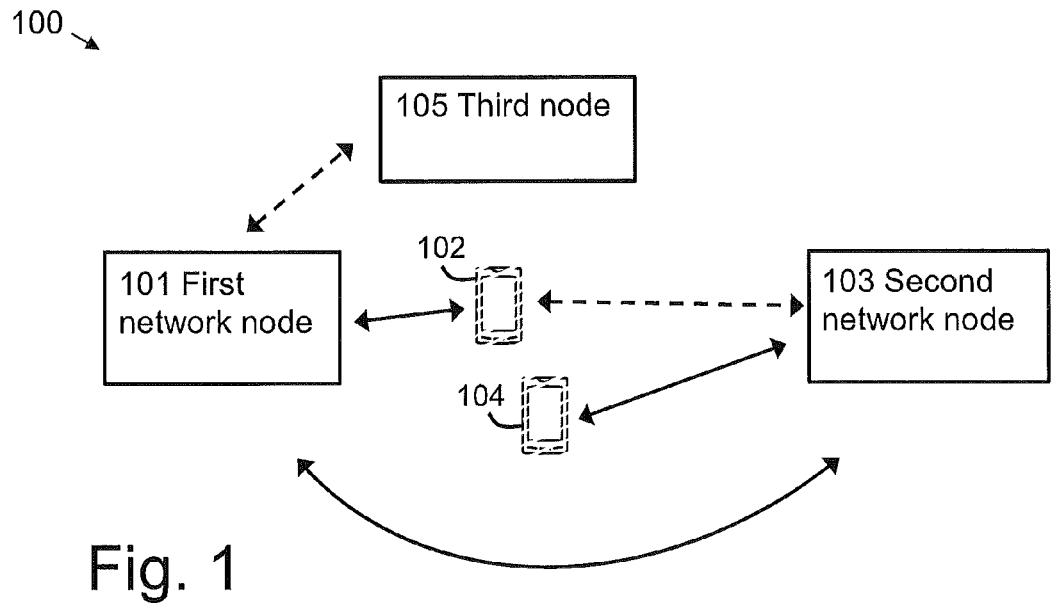
FIG. 1 is a schematic block diagram schematically depicting an example of a cellular communication system relevant for embodiments herein.

As part of the development towards embodiments herein, the situation and problem indicated in the Background will be further discussed.

In e.g. UTRA TDD there is no mobility of UEs between carriers with different chip rates. However, in the case of S-UMTS, the same operator may deploy S-UMTS with different chip rates. Therefore, mobility between different S-UMTS carriers and also mobility between cells with different chips rates would be required. However, current solutions don't provide the necessary means and support to ensure e.g. mobility of users in S-UMTS deployment scenarios.

The present disclosure disclose how network nodes comprised in a cellular communication system, e.g. based on UMTS or based on multiple Radio Access Technologies (multi-RAT) involving UMTS, may handle information associated with chip rate to facilitate S-UMTS deployment. The chip rate being a chip rate with which radio signals operate in one or more UMTS cells. It is e.g. disclosed how mobility may be ensured in S-UMTS scenarios.

Before presenting details regarding the embodiments herein, certain areas that may benefit from solutions described herein will be discussed.

A first such area is measurements, e.g. Radio Resource Management (RRM) measurements, cell ID measurements and signal measurements.

In RRM measurements, several radio related measurements are used by a UE or a radio network node to establish and keep a connection, as well as ensuring the quality of the radio link.

In cell ID measurements, the measurements are used in RRC idle state operations such as cell selection, cell reselection (e.g. between E-UTRANs, between different RATs, and to non-3GPP RATs), and minimization of drive test (MDT), and also in Radio Resource Control (RRC) connected state operations such as for cell change (e.g. handover (HO) between E-UTRANs, handover between different RATs, and handover to non-3GPP RATs). The UE has to first detect a cell, and therefore cell identification e.g. acquisition of a physical cell identity (PCI), is also a signal measurement. The UE may also have to acquire the cell global ID (CGI) of a cell. In HSPA and LTE, the serving cell can request the UE to acquire the system information of the target cell. More specifically, the SI is read by the UE to acquire the cell global identifier (CGI), which uniquely identifies a cell, of the target cell. The UE may also be requested to acquire other information such as Candidate Set Generator (CSG) indicator, CSG proximity detection etc from the target cell. The UE reads the SI of the target cell (e.g. intra-, inter-frequency or inter-RAT cell) upon receiving an explicit request from the serving network node via RRC signaling e.g. from RNC in HSPA or eNodeB in case of LTE. The acquired SI is then reported to the serving cell. The signaling messages are defined in the relevant HSPA and LTE specifications. In order to acquire the SI which contains the CGI of the target cell, the UE has to read at least part of the system information (SI) including master information block (MIB) and the relevant system information block (SIB), as described later in this text. The terms SI reading/decoding/acquisition, CGI/ECGI reading/decoding/acquisition, CSG SI reading/decoding/acquisition are interchangeably used, but have the same or similar meaning. In order to read the SI to obtain the CGI of a cell, the UE is allowed to create autonomous gaps during DL and also in UL. The autonomous gaps are created for example at instances when the UE has to read MIB and relevant SIBs of the cell, which depends upon the RAT. The MIB and SIBs are repeated with certain periodicity. Each autonomous gap is typically 3-5 ms in LTE and UE needs several of them to acquire the CGI.

With regard to said signal measurements, examples of radio measurements in UMTS FDD which can be performed by the UE are Common Pilot CHannel (CPICH) Received Signal Code Power (RSCP), CPICH Ec/No, UTRA carrier Radio Signal Strength Indicator or Indication (RSSI), UE Rx-Tx time difference measurement, System Frame Number-System Frame Number (SFN-SFN) observed time difference type 1 and type 2, System Frame Number-Connection Frame Number (SFN-CFN) observed time difference type 1 and type 2, etc.

In the RRC connected state, the UE may perform intra-frequency measurements without measurement gaps. As a general rule the UE performs inter-frequency and inter-RAT measurements in measurement gaps (aka compressed mode gaps) unless it is capable of performing them without gaps.

To enable inter-frequency and inter-RAT measurements for the UE requiring gaps, the network node has to configure the measurement gaps. The measurements performed by the UE are then reported to the network node, which may use them for various tasks. In HSPA, out of sync and in sync detection are carried out by the UE. The higher layer filtering parameters (i.e. hysteresis counters and timers) are also used.

There is also radio link failure (RLF) and eventually RRC re-establishment procedures specified in HSPA. The radio network node (e.g. base station) may also perform signal measurements. Examples of radio network node measurements in UMTS FDD are Physical Random Access Control Channel (PRACH) propagation delay between UE and itself, BS Rx-Tx time difference, transmitted carrier power, Received Total Wideband Power (RTWP), Signal to Noise Ratio (SNR), SNR error etc. Some of these radio measurements (including the cell ID mentioned earlier) are also used for positioning.

Different positioning methods exist in HSPA, including Enhanced cell ID (E-CID), AECID, Observed Time Difference Of Arrival (OTDOA), UL Time Difference of Arrival (UTDOA), Assisted-Global Navigation Satellite System (A-GNSS), e.g. Assisted Global Positioning System (A-GPS), or all combinations thereof (aka hybrid positioning method). They use UE and/or network node measurements in order to determine UE location.

In LTE, the positioning node (e.g., Evolved Serving Mobile Location Centre (E-SMLC) aka location server) configures UE to perform also inter-RAT UMTS measurements e.g. CPICH RSCP and CPICH Ec/Io for determining UE position, where Ec/Io is the so called ratio of received power of the carrier to the all over noise. In LTE the positioning node communicates with UE using LTE positioning protocol (LPP).

A second example of such area as mentioned above is "Multi-Carrier or Carrier Aggregation (CA) Concept".

To enhance peak-rates within a technology, multi-carrier or carrier aggregation solutions are used. For example, it is possible to use multiple 5 MHz carriers in HSPA to enhance the peak-rate within the HSPA network. Similarly, in LTE for example multiple 20 MHz carriers or even smaller carriers (e.g. 5 MHz) can be aggregated in the UL and/or on DL.

Each carrier in multi-carrier or carrier aggregation system is generally termed as a component carrier (CC) or sometimes is also referred to a cell. In simple words, the component carrier (CC) means an individual carrier in a multi-carrier system. The term carrier aggregation (CA) is also called (e.g. interchangeably called) "multi-carrier system", "multi-cell operation", "multi-carrier operation", "multi-carrier" transmission and/or reception. This means that the CA is used for transmission of signaling and data in the uplink and downlink directions. One of the CCs is the primary component carrier (PCC) or simply primary carrier or even anchor carrier. The remaining ones are called secondary component carrier (SCC) or simply secondary carriers or even supplementary carriers. Generally, the primary or anchor CC carries the essential UE specific signaling. The primary CC exists in both uplink and direction CA.

The network node may assign different primary carriers to different UEs operating in the same sector or cell. Therefore, the UE has more than one serving cell in downlink and/or in the uplink: one primary serving cell and one or more secondary serving cells operating on the PCC and SCC respectively. The serving cell is interchangeably called the primary cell (PCell) or the primary serving cell (PSC). Similarly, the secondary serving cell is interchangeably called the secondary cell (SCell) or the secondary serving cell (SSC).

Regardless of the terminology, the PCell and SCell(s) enable the UE to receive and/or transmit data simultaneously or at different times, as and if needed. More specifically, the PCell and SCell exist in DL and UL for the reception and transmission of data by the UE simultaneously or at different times, as and if needed. The remaining non-serving cells on the PCC and SCC are called neighbor cells.

The CCs belonging to the CA may belong to the same frequency band (aka intra-band CA) or to different frequency band (inter-band CA) or any combination thereof (e.g. 2 CCs in band A and 1 CC in band B). The inter-band CA comprising of carriers distributed over two bands is also called dual-band-dual-carrier-HSDPA (DB-DC-HSDPA) in HSPA or inter-band CA in LTE.

Furthermore, the CCs in intra-band CA may be adjacent or non-adjacent in frequency domain (aka intra-band non-adjacent CA). A hybrid CA comprising of intra-band adjacent, intra-band non-adjacent and inter-band is also possible.

Using carrier aggregation between carriers of different technologies is also referred to as "multi-RAT carrier aggregation" or "multi-RAT-multi-carrier system" or simply "inter-RAT carrier aggregation". For example, the carriers from WCDMA and LTE may be aggregated. Another example is the aggregation of LTE and CDMA2000 carriers.

For the sake of clarity, carrier aggregation within the same technology as described can be regarded as 'intra-RAT' or simply 'single RAT' carrier aggregation. The CCs in CA may or may not be co-located in the same site or base station or radio network node (e.g. relay, mobile relay etc). For instance the CCs may originate (i.e. transmitted/received) at different locations (e.g. from non-located BS or from BS and RRH or RRU). The well-known examples of combined CA and multi-point communication are DAS, RRH, RRU, CoMP, multi-point transmission/reception etc. The present disclosure also applies to the multi-point carrier aggregation systems.

To sum up, introduction of S-UMTS will e.g. enable cells to operate UTRA FDD using different chip rates. The cells may belong to the same carrier, or different carriers may operate using different chip rates. Although in existing solutions, a network node may be required to send a chip rate to a UE, the network node is not aware of the chip rate(s) or associated information (e.g. scaling factor to scale chip rate with respect to legacy or reference chip rate), which chip rate(s) are used in different cells on a carrier or cells on different carriers in the coverage area.

Lack of such mechanism or support thereof prevent or at least makes it difficult for the network node to obtain chip rate information of cells which are used by the UE for performing radio tasks e.g. measurement, carrier aggregation, positioning, mobility etc.

The present disclosure and embodiments herein relate to methods and network nodes by means of which e.g. another network node may obtain the required chip rate information. This in turn enables the network node to generate the appropriate corresponding information to be sent to e.g. a UE or to other network nodes to be able to carry out relevant radio procedures.

The present disclosure i.a. discloses how a first network node may signal S-UMTS information to another, second network node and how the first network node may obtain S-UMTS information, e.g. from another, third network node. The S-UMTS information comprise information on chip rate(s). The present disclosure also discloses how a node such as a UE or a radio network node may signal the node's S-UMTS capability to a network node, such as a radio network node.

Although mainly described as methods in the following, the present disclosure also relate to nodes, e.g. network nodes and UEs, arranged to function in a manner corresponding to the methods described herein.

FIG. 1 is a schematic block diagram schematically depicting an example of a cellular communication system 100, relevant for embodiments herein. The cellular communication system 100 is typically based on UMTS or based on multi-RAT involving UMTS, and comprises UMTS cells (not shown). The cellular communication system 100 may implement S-UMTS or at least different chip rates with which radio signals operate in said UMTS cells. The cellular communication system 100 may be a so called Multi Carrier or Carrier Aggregation system. The cellular communication system 100 comprises a first network node 101 that is typically, but not necessarily, a radio network node such as a base station, e.g. a LTE eNB, or a controlling node of a base station, e.g. a UMTS RNC for controlling one or more NodeBs, i.e. UMTS base stations. The first network node 101 may be a network node that is not a radio network node but instead e.g. a network node comprised in core network (not shown) of the cellular communication system 100, i.e. in contrast to a radio network node, which is comprised in a RAN (not shown) of the cellular communication system 100. The first network node 101 may serve and/or control and/or manage one or more wireless devices, e.g. UEs, such as a first wireless device 102 as shown in FIG. 1. This may be done directly when being the LTE eNB or via one or more NodeBs when being the UMTS RNC.

In some embodiments, the first wireless device 102 is served in a cell (not shown) by the first network node 103, e.g. in a LTE cell by the first network node 103 being said LTE eNB.

The cellular communication system 100 further comprises another, second network node 103, also typically, but not necessarily, a radio network node such as a base station, e.g. LTE eNB, or controlling node of a base station, in some embodiments a UMTS RNC for controlling one or more NodeBs. The controlling node may, via said one or more Node Bs, serve and/or control and/or manage one or more wireless devices, e.g. UEs, such as a second wireless device 104 as shown in FIG. 1.

In some embodiments, the second network node 103 has a radio coverage area, e.g. corresponding to a cell, at least partially overlapping with a radio coverage area, e.g. corresponding to another cell, of the first network node 101. The second network node 103 may thus be a neighbouring network node to the first network node 101 and may thus e.g. be a new serving node for the first wireless device 102 and thereby e.g. subject for a handover of the first wireless device 102 from the first network node 101.

The first network node 101 and the second radio network node 103 may be communicatively connected e.g. via a RAN or one or more core networks of the cellular radio system 100.

Moreover, the cellular communication system 100 may comprise a third node 105 that may be communicatively connected to the first network node 101. The third node 105 may be third network node or a third wireless device In case of a network node, the third node 105 is typically, but not necessarily, a radio network node such as base station, a Node B or a controlling node of a base station, in some embodiments a UMTS RNC for controlling one or more Node Bs.

In some embodiments, first network node 101 is a first RNC and the third node 105 is a Node B controlled by the first RNC.

In other embodiments the first network node 101 is the first RNC and the third node 105 is another, second RNC.

In yet other embodiments, the first network node 101 is an LTE eNB and the third node 105 is an UMTS node, e.g. RNC or any node with which the LTE eNB may directly or indirectly communicate.

Attention is drawn to that FIG. 1 is only schematic and for exemplifying purpose and that not everything shown in the figure is required for all embodiments herein, as will be evident from the below. Also, a cellular communication system that in reality corresponds to the cellular communication system 100 typically comprises one or more core networks, several further network nodes, base stations, cells etc., as realized by the skilled person, but which are not shown herein for the sake of simplifying the description.

The expressions "first chip rate information" and the already mentioned "S-UMTS information", are used in the following and will now be explained.

The first chip rate information is information associated with, e.g. informing about, at least one chip rate with which radio signals are operable, e.g. may be operated or are operating, in one or more UMTS cells that may implement scalable UMTS, i.e. S-UMTS. The first chip rate information is typically comprised in S-UMTS information, i.e. information relating to scalable UMTS. The S-UMTS information is typically configuration and/or capability information, and comprises at least said first chip rate information, i.e. information that may be associated with a chip rate with which radio signals operate in at least one UMTS cell served by a radio network node, which e.g. may be the third network node 105, or some other network node. The S-UMTS information may further comprise the information associated with the chip rate with which radio signals operate in a plurality of cells on the same carrier frequency i.e. operating using the same UTRA Absolute Radio Frequency Channel Number (UARFCN).

The first chip rate information may comprise one or more of the following:
  Chip rate of a cell or group of cells or all cells on the same carrier frequency e.g. 1.96 Mcps.
  Scaling factor (K) to scale chip rate of a cell or group of cells or all cells on the same carrier frequency e.g. K=½ for 1.96 Mcps.
  Reference chip rate or ID of reference chip rate to scale the chip rate e.g. 3.84 Mcp. This can also be pre-defined or configured by the first network node 101 when obtaining the S-UMTS information, e.g. from the third network node 105.

It may be concluded from the present context that chip rate information associated with at least one chip rate, may be described as information that explicitly or implicitly discloses, or identifies, at least one chip rate.

The S-UMTS information may further comprise additional information, wherein examples of additional information are: Channel bandwidth of cell or group of cells or all cells on a carrier whose chip rate information is obtained by the first network node 101.

Figure 2:
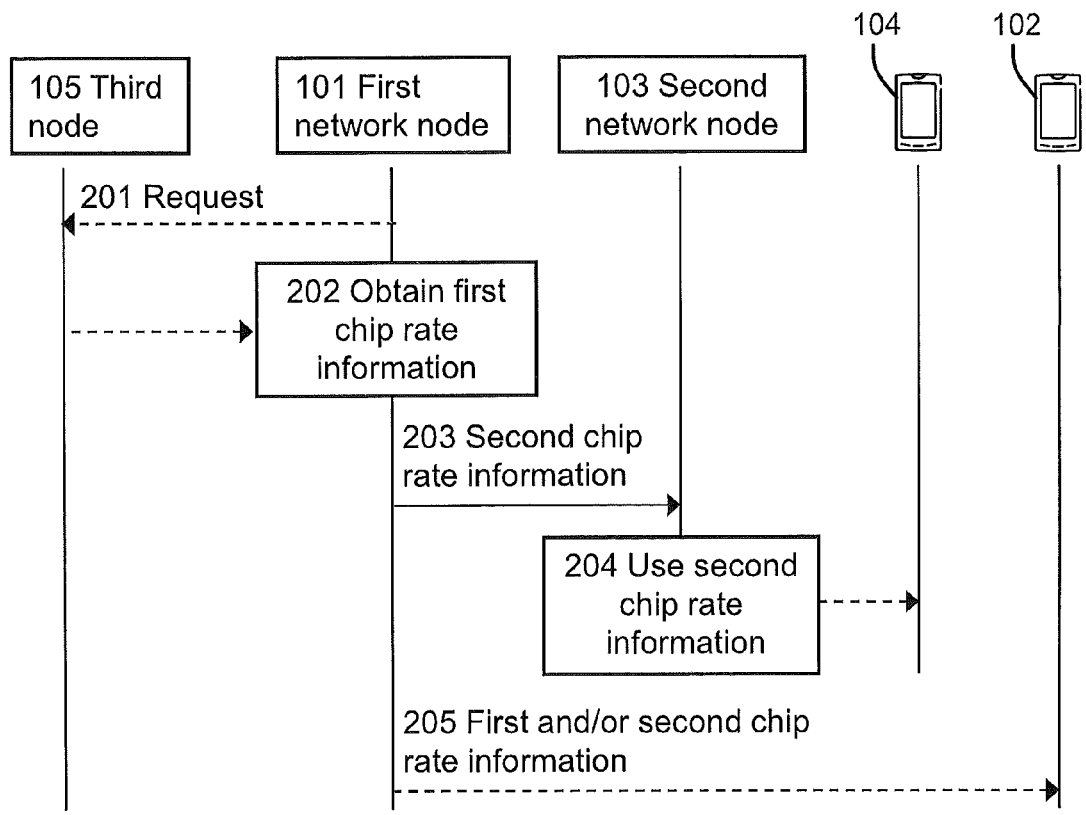
FIG. 2 schematically depicts a combined signaling diagram and flowchart for describing embodiments herein.

FIG. 2 schematically depicts a combined signaling diagram and flowchart and will be used to describe embodiments herein relating to a method for handling information associated with one or more UMTS cells. The method is performed in the cellular communication system 100. The method comprises the following actions, which actions may be taken in any suitable order and/or be carried out fully or partly overlapping in time when this is possible and suitable.

Action 201

In order to e.g. trigger Action 202 below, the first network node 101 may send, to the third node 105, a request, e.g. in the form of a message, requesting the third node 105 to send the first chip rate information to the first network node 101. The first chip rate information is here information associated with at least one chip rate with which radio signals are operable in said one or more UMTS cells.

The first network node 101 may in the request include information, such an identifier, of one or more network nodes which S-UMTS information is sought. For example the first network node 101 may specify a base station identifier, e.g. cell ID, CGI etc., of a sought network node operating using a S-UMTS carrier. Hence, in the present action, the first network node 101 may send a message to the third node 105, requesting the third node 105 to provide S-UMTS capability information for the third node 105, e.g. information relating to S-UMTS capability of the third node 105.

In one example, where the first network node 101 is an RNC and the third node 105 is a Node B, the first network node 101 may send the request over the so called Iub interface requesting the third node 105 to provide S-UMTS capability information for all local cells in the third node 105, such as UMTS cells being served by the third node 105.

In another example, where the first network node 101 is a RNC1, i.e. a first RNC, and the third node 105 is a RNC2, i.e. another, second RNC, the first network node 101 may, e.g. by sending the request, trigger the third node 105 to provide S-UMTS information for all S-UMTS capable neighbor cells known by the third node 105. The third node 105 may in this case have configured S-UMTS capable local cells in the Node B(s), such as UMTS cells being served by the Node B(s), for S-UMTS operation and may thereby have the information available. Alternatively or additionally the third node 105 may contain the information for other reasons, such as a priori, e.g. stored information based on earlier requests or triggers to obtain such information from other RNCs.

In yet another example, where the first network node 101 is a RNC1, i.e. a first RNC, and the third node 105 is a RNC2, i.e. another, second RNC, the first network node 101 may request the third node 105 to provide S-UMTS information for a particular cell operated by certain Node B(s) managed by the third node 105. The third node 105 may in this case have configured S-UMTS capable local cells in the Node B(s) for S-UMTS operation.

More specific examples, e.g. in the form of modified existing messages, regarding what the request may comprise or what may constitute the request, is discussed separately below.

Action 202

The first network node 101 obtains the first chip rate information.

Obtain the first chip rate information may comprise receiving it from the third network node 105, e.g. proactively or in response to a request, such as in response to that the first network node 101 has sent the request as in Action 201 and receipt of the request by the third node 105. As already explained above, the first chip rate information is information associated with a chip rate with which radio signals operate in said one or more UMTS cells.

The first network node 101 may obtain the S-UMTS information from the third network node 105. The S-UMTS information may be configuration information, e.g. S-UMTS parameters with which a radio network node, e.g. base station, is configured to operate or being operated currently—such as 1.92 Mcps. The S-UMTS information may also be capability information, e.g. all S-UMTS configurations supported by a radio network node such as a base station supporting 3 chip rates: 3.84, 1.92 and 0.96 Mcps.

The first network node 101 may obtain the S-UMTS information comprising S-UMTS configuration information, e.g. parameters such as chip rates, BWs, scalability parameters etc used in base stations, from the third node 105 in response to a sent request, such as the sent request according to Action 201. The third node 105 may even send it to the first network node 101 proactively.

The first network node 101 may also obtain the S-UMTS information comprising S-UMTS capability information, e.g. supported chip rates by base stations, from the third network node 105 in response to a sent request, such as the sent request according to Action 201. The third node 105 may even send it to the first network node 101 proactively.

The third node 105 may send a message to the first network node 101 containing the S-UMTS information. The S-UMTS information may be used in the third node 105 or in another network node. That is, the obtained S-UMTS information, although e.g. received from the third node 105, may but need not relate to the third node 105 as such. For example, the S-UMTS information, such as chip rate, may fully or partly relate to another node or cell that is not handled by the third node 105, but that the third node 105 has knowledge about or has access to such information.

Alternatively or additionally to that the first network node 101, in the request (see Action 201), explicitly may have identified a cell whose S-UMTS information is sought, the third node 105 may also provide carrier frequency of multiple cell, e.g. all cells or all cells the third node 105 has knowledge about, using S-UMTS carriers. Information about the carrier frequencies may be expressed in terms of frequency channel number e.g. UARFCN.

The third node 105 may in turn have obtained the S-UMTS information that it sends to the first network node 101, e.g. obtain the S-UMTS information of S-UMTS carrier(s) used in the third node 105 or in another node in order to send the said S-UMTS information to the first network node 101. The obtaining can be done by sending request to said another node and/or be based on stored information or historical data used for earlier sending to the first network node 101 e.g. in response to earlier requests.

More specific examples, e.g. in the form of modified existing messages, regarding how S-UMTS information comprising the first chip rate information may be sent from the third node 105 to the first network node 101, is discussed separately below.

Action 203

The first network node 101 sends second chip rate information to the second network node 103, which second chip rate information is based on the first chip rate information obtained in Action 202.

The second chip rate information may be comprised in information referred to as S-UMTS information sent to the second network node 103. The S-UMTS information sent to the second network node 103, and thus e.g. the second chip rate information comprised therein, may comprise at least information associated with or that directly or indirectly depict the chip rate used for operating radio signals, e.g. receiving and/or transmitting radio signals, on at least one cell. Said at least one cell operates over certain carrier frequency, which may also be indicated in the signaled information, e.g. be part of the S-UMTS information sent to the second network node 103.

When the first chip rate information is comprised in said S-UMTS information obtained by the first network node 101, the S-UMTS information or a modified version of the obtained S-UMTS information may comprise the second chip rate information and be sent to the second network node 103. That is, the S-UMTS information sent to the second network node 103 may be the same as the obtained S-UMTS information and thus the second chip rate information may be the same as the first chip rate information. More generally, the second chip rate information may comprise at least part of the first chip rate information, i.e. may be a subset thereof, and/or be a modified version thereof. This may be a result from that the S-UMTS information sent to the second network node 103 (i.e. S-UMTS information comprising the second chip rate information) may be a modified version of the obtained S-UMTS information (comprising the first chip rate information). See e.g. the indicator example mentioned below. In any case, ii may be realized that the second chip rate information should inform about at least one chip rate of the at least one chip rate that the first chip rate information informs about.

In some embodiments, the first network node 101 sends an entire or part of the obtained first chip rate information, e.g. comprised in S-UMTS information, to the second network node 103 and/or the first wireless device 102. For example, the first network node 101 may be an RNC that receives the first chip rate information, e.g. comprised in S-UMTS information, from a plurality of Node Bs and forwards at least part of the received information to the second network node 103 and/or the first wireless device 103. In another example, the second chip rate information may contain chip rates (or scaling factor compared to a reference chip rate) of each cell or common chip rate of all cells on a carrier frequency. The former approach may be used in case cells on the same carrier have different chip rates; therefore the chip rate information may be sent in neighbor cell list information. The latter approach of sending chip rate per carrier is typically used when all cells on a carrier or cells in the neighbor cell list operate using the same chip rate.

In some embodiments, the first network node 101, based on the obtained first chip rate information (e.g. comprised in the obtained S-UMTS information) derives or generates an indicator, which indicates at least implicitly the chip rate, and then sends the indicator, which may be referred to as a S-UMTS indicator or chip rate indicator, to the second network node 103 as, or as part of, the second chip rate information. The indicator is discussed and exemplified separately below.

Action 204

The second network node 103 uses the second chip rate information received in Action 203.

In some embodiments, the second chip rate information is used for configuring, e.g. with S-UMTS parameters, the second network node 103.

When the second network node uses the received second chip rate information, this may involve the first wireless device 102 and/or the second wireless device 104. The first wireless device 102 and/or the second wireless device 104 may respectively be served or controlled or managed by the first network node 101 and/or the second network node 103 to execute one or more radio procedures. The radio procedures may relate to one or more of the following: mobility, positioning, radio measurement, Minimization of Drive Tests (MDT) configuration for configuring the first wireless device 102 and/or the second wireless device 104 to log certain information. In some embodiments, the second network node 103 is a RNC for controlling operation of the second wireless device 104. In some embodiments, the second network node 103 is a positioning node for configuring the second wireless device 104 to perform positioning related tasks. In some embodiments, the second network node 103 is a node for configuring the second wireless device 104 as part of a MDT configuration to log one or more parameters related to the second chip rate information. These examples and embodiments are discussed in some further detail below.

When the second network node 103 uses second chip rate information and this involves the first wireless device 102 and/or the second wireless device 104, they are typically involved with regard to a respective cell, e.g. one of said UMTS cells, that is another cell than a cell in which the respective wireless device is being served or controlled or managed.

A first example: The first wireless device 101, which is served and/or controlled and/or managed in a cell by the first network node 101, may be involved when the second network node 103 uses the second chip rate information regarding mobility, such as investigating or preparing handover of the first wireless device 101 to another cell, e.g. controlled by the second network node 103.

A second example: The second wireless device 104, which is served and/or controlled and/or managed in a cell by the second network node 103, may be involved when the second network node 103 uses the second chip rate information regarding positioning, e.g. by providing information, based on the second chip rate information to the second wireless device 104, with regard to another cell or cells to be used in positioning measurements.

Action 205

The first network node 101 may send at least part of the first chip rate information and/or the second chip rate information to one or more wireless devices, e.g. the first user equipment 102 and/or the second wireless device 104.

Said one or more wireless devices may e.g. use this information for different purposes than the second network node 103, i.e. the information, or part thereof, may be used for multiple purposes.

Sending of information to wireless devices that are not in direct connection with the first network node 101 will take part via some intermediate nodes, e.g. a radio network node. For example, the first network node 101 sending information to the second wireless device 104 may be via the second network node 103.

Some more specific examples will now follow that relate to parts of what has been discussed above.

First, a number of examples will be elaborated together in a group. In these examples, what is referred to as an exemplary network node and an exemplary UE may in a first scenario correspond to the first network node 101 and the first wireless device 102, respectively, and in a second scenario to the second network node 103 and the second wireless device 104, respectively. Similarly, what is referred to as S-UMTS information mentioned in these examples may in the first scenario correspond to the obtained S-UMTS information, i.e. as obtained by the first network node 101 in Action 202, and comprising the first chip rate information. In the second scenario the S-UMTS information may instead correspond to the S-UMTS information sent to the second network node 103 in Action 203, and comprising the second chip rate information.

The exemplary network node referred to in the examples may be a network node serving or controlling or managing the exemplary UE to execute one or more radio procedures. Examples of radio procedures are mobility, positioning, radio measurement, MDT configuration for configuring UE to log certain information, which in this case is S-UMTS information etc.

The examples are:
The exemplary network node may be an RNC controlling operation of the exemplary UE, such as performing measurements that configures the exemplary UE with measurement configuration using RRC protocol. The measurement configuration in this case shall include S-UMTS information to enable measurement on cells operating using S-UMTS parameters e.g. different chips rates.

In another example, the exemplary network node is a positioning node that may configure the exemplary UE to perform positioning related tasks e.g. positioning measurement, determining a position of the exemplary UE, sending assistance information e.g. to another network node to aid positioning measurements etc. The positioning node may configure the exemplary UE to perform positioning measurements on cells operating using S-UMTS configuration parameters and therefore the exemplary UE may also be provided with the S-UMTS parameters by the positioning node e.g. chip rate used on cells on which positioning measurement is requested.

In yet another example the exemplary network node may configure the exemplary UE as part of a Minimization of Drive Test (MDT) configuration to log one or more parameters related to S-UMTS information (e.g. chip rate used in a cell, chip rate used on cells on the same carrier frequency etc) and report the results. The logging of S-UMTS parameters used in a cell may be time stamped. The time stamp may be expressed in absolute or relative values. A relative time stamp is defined as the time elapsed from a reference time to the moment the measurement is logged by a radio node. The reference time may be configured by network or may be the time when certain event occurs e.g. serving cell failure, radio link failure, handover failure etc.

The S-UMTS information may be sent to the exemplary network node and/or exemplary UE periodically, at specific instances (e.g. during initial setup, after cell change etc) etc.

The S-UMTS information may also be sent to the exemplary network node and/or exemplary UE in a user equipment, i.e. wireless device, specific message such as over dedicated channel (e.g. DCH), shared channel (HS-DSCH by RNC via Node B, PDSCH by eNB etc) for UEs in higher activity RRC states. Examples of higher activity states are such that may be called CELL_DCH state, RRC_CONNECTED state, active state etc.

The S-UMTS information may also be sent to the exemplary network node and/or exemplary UE in a user equipment, i.e. wireless device, specific message such as over dedicated channel (e.g. DCH), shared channel (HS-DSCH by RNC via Node B, PDSCH by eNB etc) for UEs in higher activity RRC states. Examples of higher activity states are such that may be called CELL_DCH state, RRC_CONNECTED state, active state etc.

The S-UMTS information may be provided for cells operating on any carrier frequency including the serving carrier frequencies (e.g. primary and secondary serving carriers), inter-frequency carrier frequencies and inter-RAT carrier frequencies of the node (e.g. when a serving cell of the exemplary UE is LTE FDD, LTE TDD or GSM/GERAN/EDW but the exemplary UE is measuring on cells on S-UMTS carrier). In this case the target node, e.g. the first network node 101 or the second network node 103, receiving S-UMTS information can be an inter-RAT node (e.g. LTE eNB, GSM/GERAN BTS or BSC etc). The inter-RAT node may receive this information from an UMTS node (e.g. Node B, RNC etc), e.g. the third node 105 or the first network node, directly or via a core network or via any other interface such as from Operations & Maintenance (O&M) and/or Operations Support Systems (OSS) etc.

The node receiving the S-UMTS information, e.g. the first network node 101, the first user equipment 102, the second network node 103 and/or the second wireless device 104, may uses it for one or more radio operations or procedures, for example:

Performing radio measurements on signals of cell or of plurality of cells assuming the indicated chip rate obtained via the S-UMTS information.

Performing mobility such as cell reselection, cell reselection etc., by using the performed radio measurements.

Determining the location of a UE using positioning measurements on signals of cell or of plurality of cells assuming the indicated chip rate obtained via the S-UMTS information.

Signaling the performed radio or positioning measurements to network node e.g. serving RNC, eNB, BSC, positioning node etc.

Triggering selective blind detection of chip rate used on one or more cells by using the S-UMTS information e.g. only doing blind detection if indicator informs that neighbor cell operates using chip rate that is different than that of the serving cell. The blind detection may be performed by correlating over a known pilot or reference signals (e.g. P-SCH, S-SCH, P-CPICH) assuming different possible (predefined chip rates).

Signaling the blindly detected chip rate used on one or more cells to the network node.

It will now follow some specific examples regarding what the request, as discussed under Action 201 above, may comprise or what may constitute the request, i.e. specific examples relevant for Action 201.

Table 1 shows an example of the request is an AUDIT REQUEST message containing the Start Of Audit Sequence Indicator IE that may be sent by an RNC to a Node B over the so called Iub interface (i.e. using NBAP protocol) requesting the Node B to report back S-UMTS capability information, including the first chip rate information, for all local cells under the Node B control with the AUDIT RESPONSE message.

TABLE 1

AUDIT REQUEST message containing Start Of Audit Sequence Indicator

| IE/Group Name | Presence | IE Type and Reference | Semantics Description | Criticality | Assigned Criticality |
|---|---|---|---|---|---|
| Message Discriminator | M | 9.2.1.45 | | — | |
| Message Type | M | 9.2.1.46 | | YES | reject |
| Transaction ID | M | 9.2.1.62 | | — | |
| Start Of Audit Sequence Indicator | M | 9.2.1.56B | | YES | reject |

Another example is a RADIO LINK SETUP or RADIO LINK ADDITION message that may be sent by a RNC1, i.e. a first RNC, to establish a Radio Link to a cell under RNC2, i.e. a second RNC. This message triggers RNC2 to return S-UMTS information for S-UMTS capable neighbor cells using the Neighbouring FDD Cell Information IE in a positive or negative reply message. Another example is a INFORMATION EXCHANGE INITIATION REQUEST message which may be used by RNC1 to request RNC2 to provide information about indicated cells. See Table 2 below for an example. In the table, an asterisk (*) indicates rows with examples of how an existing message may be amended. An existing ANR Cell List IE or a new explicit IE could be used.

TABLE 2

| IE/Group Name | Presence | Range | IE Type and Reference | Semantics Description | Criticality | Assigned Criticality |
|---|---|---|---|---|---|---|
| INFORMATION EXCHANGE INITIATION REQUEST message requesting information about cells. | | | | | | |
| Message Type | M | | 9.2.1.40 | | YES | reject |
| Transaction ID | M | | 9.2.1.59 | | — | |
| Information Exchange ID | M | | 9.2.1.31A | | YES | reject |
| CHOICE Information Exchange Object Type | M | | | | YES | reject |
| >Cell | | | | | | |
| >>C-ID | M | | 9.2.1.6 | May be a GERAN cell identifier. | — | |
| >Additional Information Exchange Object Types | | | | | — | |
| >>GSM Cell | | | | | — | |
| >>>CGI | M | | 9.2.1.5D | | — | |
| >>MBMS Bearer Service | | | | | — | |
| >>>MBMS Bearer Service List | | 1 . . . <maxNrOf MBMSServices> | | | GLOBAL | reject |
| >>>>TMGI | M | | 9.2.1.80 | | — | |
| >>MBMS Bearer Service in MBMS Cell | | | | FDD only. | GLOBAL | reject |
| >>>MBMS Cell List | | 1 . . . <maxNrOf Cells> | | | — | |
| >>>>C-ID | M | | 9.2.1.6 | Cell identifier of cell in RNC initiating Information Exchange Initiation procedure. | — | |
| >>>>MBMS Bearer Service List | | 1 . . . <maxNrOf MBMSServices> | | | — | |
| >>>>>TMGI | M | | 9.2.1.80 | | — | |
| >>MBMS Cell | | | | FDD only. | GLOBAL | reject |
| >>>MBMS Cell List | | 1 . . . <maxNrOf Cells> | | | — | |
| >>>>C-ID | M | | 9.2.1.6 | Cell identifier of cell in receiving RNC not initiating Information Exchange Initiation procedure. | — | |
| >>ANR Cell | | | | | GLOBAL | reject |
| >>>ANR Cell List | | 1 . . . <maxNrOf ANRCellsl> | | | — | |
| >>>>C-ID | M | | 9.2.1.6 | | — | |
| >> Common E-RGCH Cell | | | | | GLOBAL | reject |
| >>>Common E-RGCH Cell List | | 1 . . . < maxNoOfCommonRGCells> | | | — | |
| >>>>C-ID | M | | 9.2.1.6 | | — | |
| >>S-UMTS Cells | | | | | GLOBAL | reject |
| *>>>S-UMTS Cell List | | 1 . . . <maxNrOf S-UMTSCellsl> | | | — | |
| * >>>>C-ID | M | | 9.2.1.6 | | — | |
| * Information Type | M | | 9.2.1.31E | | YES | reject |
| * Information Report Characteristics | M | | 9.2.1.31C | | YES | reject |

It will now follow some specific examples regarding how S-UMTS information comprising the first chip rate information may be sent from the third node 105 to the first network node 101, i.e. specific examples relevant for Action 202. An example of information element (IE) containing S-UMTS capability information sent by the third network node (e.g. Node B) to the first network node (e.g. RNC) over Iub interface (i.e. using NBAP protocol) for all local cells under the Node B control is shown in Table 3. In the table, an asterisk (*) indicates rows with examples of how an existing message may be amended.

TABLE 3

AUDIT RESPONSE message containing S-UMTS capability information

| IE/Group Name | Presence | Range | IE Type and Reference | Semantics Description | Criticality | Assigned Criticality |
|---|---|---|---|---|---|---|
| Message Discriminator | M | | 9.2.1.45 | | — | |
| Message Type | M | | 9.2.1.46 | | YES | reject |
| Transaction ID | M | | 9.2.1.62 | | — | |
| End Of Audit Sequence Indicator | M | | 9.2.1.29A | | YES | ignore |
| Cell Information | | 0 . . . <max CellinNodeB> | | | EACH | ignore |
| >C-ID | M | | 9.2.1.9 | | — | |
| >Configuration Generation ID | M | | 9.2.1.16 | | — | |
| >Resource Operational State | M | | 9.2.1.52 | | — | |
| >Availability Status | M | | 9.2.1.2 | | — | |
| >Local Cell ID | M | | 9.2.1.38 | The local cell that the cell is configured on | — | |
| >Primary SCH Information | O | | Common Physical Channel Status Information 9.2.1.13A | Applicable to FDD only | YES | ignore |
| >Secondary SCH Information | O | | Common Physical Channel Status Information 9.2.1.13A | Applicable to FDD only | YES | ignore |
| >Primary CPICH Information | O | | Common Physical Channel Status Information 9.2.1.13A | Applicable to FDD only | YES | ignore |
| * >S-UMTS capability information | | 0 . . . <max S-UMTSChiprates> | | | EACH | ignore |
| * >>Chip rate | M | | Supported chiprate | | — | |

Another example of an information element (IE) containing S-UMTS information sent by RNC2 to RNC1 over Iur interface is shown in Table 4. In the tables, italics and/or asterisk (*) indicate where/how an existing message may be amended. The RADIO LINK SETUP or RADIO LINK ADDITION message that is sent by RNC1 to establish a Radio Link to a cell under RNC2 may trigger RNC2 to return S-UMTS information for S-UMTS capable neighbor cells using the Neighbouring FDD Cell Information IE in the positive or negative reply message.

TABLE 4

Neighbouring FDD Cell Information IE containing S-UMTS information.

| IE/Group Name | Presence | Range | IE Type and Reference | Semantics Description | Criticality | Assigned Criticality |
|---|---|---|---|---|---|---|
| Neighbouring FDD Cell Information | | 1 . . . <maxNrOfFDDNeighbours PerRNC> | | | — | |

TABLE 4-continued

Neighbouring FDD Cell Information IE containing S-UMTS information.

| IE/Group Name | Presence | Range | IE Type and Reference | Semantics Description | Criticality | Assigned Criticality |
|---|---|---|---|---|---|---|
| >C-ID | M | | 9.2.1.6 | | — | |
| >UL UARFCN | M | | UARFCN 9.2.1.66 | Corresponds to Nu in TS 25.102 [6]. | — | |
| >DL UARFCN | M | | UARFCN 9.2.1.66 | Corresponds to Nd in TS 25.102 [6]. | — | |
| >Frame Offset | O | | 9.2.1.30 | | — | |
| >Primary Scrambling Code | M | | 9.2.1.45 | | — | |
| >Primary CPICH Power | O | | 9.2.1.44 | | — | |
| >Cell Individual Offset | O | | 9.2.1.7 | | — | |
| >Tx Diversity Indicator | M | | 9.2.2.50 | | | |
| >STTD Support Indicator | O | | 9.2.2.45 | | — | |
| >Closed Loop Mode1 Support Indicator | O | | 9.2.2.2 | | — | |
| >Not Used | O | | NULL | | — | |
| >Restriction State Indicator | O | | 9.2.1.48C | | YES | ignore |
| >DPC Mode Change Support Indicator | O | | 9.2.2.56 | | YES | ignore |
| >Coverage Indicator | O | | 9.2.1.12G | | YES | ignore |
| >Antenna Co-location Indicator | O | | 9.2.1.2C | | YES | ignore |
| >HCS Prio | O | | 9.2.1.30N | | YES | ignore |
| >Cell Capability Container FDD | O | | 9.2.2.D | | YES | ignore |
| >SNA Information | O | | 9.2.1.52Ca | | YES | ignore |
| >Frequency Band Indicator | O | | 9.2.2.59 | | YES | ignore |
| >Max UE DTX Cycle | C-CPC-DTX-DRXCapable | | 9.2.2.87 | | YES | ignore |
| >Multiple PLMN List | O | | 9.2.1.117 | | YES | ignore |
| >Secondary Serving Cell List | C-MC-Capable | | 9.2.2.101 | | YES | ignore |
| >Dual Band Secondary Serving Cell List | C-DB-Capable | | Secondary Serving Cell List 9.2.2.101 | | YES | ignore |
| >Cell Capability Container Extension FDD | O | | 9.2.2.123 | | YES | ignore |

TABLE 4-continued

Neighbouring FDD Cell Information IE containing S-UMTS information.

| IE/Group Name | Presence | Range | IE Type and Reference | Semantics Description | Criticality | Assigned Criticality |
|---|---|---|---|---|---|---|
| >Cell List Validity Indicator | O | | ENUMERATED (Ignore Secondary Serving Cell List, Ignore Dual Band Secondary Serving Cell List, Ignore Both) | | YES | Ignore |
| * S-UMTS Information | O | | xxxx | Encoding of chiprate or scaling factor | YES | Ignore |

Another example is the INFORMATION EXCHANGE INITIATION REQUEST message which can be used by RNC1 to request RNC2 to provide information about indicated cells. The Requested Data Value IE (see Table 5b) or the ANR Cell Information IE (see Table 5a) in the Requested Data Value IE in the INFORMATION EXCHANGE INITIATION RESPONSE message includes S-UMTS information for the requested cells. In the tables, italics and/or asterisk (*) indicate where/how an existing message may be amended.

TABLE 5a

ANR FDD Cell Information IE including the S-UMTS information IE.

| IE/Group Name | Presence | Range | IE Type and Reference | Semantics Description | Criticality | Assigned Criticality |
|---|---|---|---|---|---|---|
| Primary CPICH Power | O | | 9.2.1.44 | | | |
| Tx Diversity Indicator | M | | 9.2.2.50 | | | |
| STTD Support Indicator | O | | 9.2.2.45 | | | |
| Closed Loop Mode1 Support Indicator | O | | 9.2.2.2 | | | |
| Restriction State Indicator | O | | 9.2.1.48C | | | |
| DPC Mode Change Support Indicator | O | | 9.2.2.56 | | | |
| Cell Capability Container FDD | O | | 9.2.2.D | | | |
| SNA Information | O | | 9.2.1.52Ca | | | |
| Frequency Band Indicator | O | | 9.2.2.59 | | | |
| Max UE DTX Cycle | O | | 9.2.2.87 | | | |
| ANR Multiple PLMN List | O | | 9.2.1.153 | | | |
| Secondary Serving Cell List | O | | 9.2.2.101 | | | |
| Dual Band Secondary Serving Cell List | O | | Secondary Serving Cell List 9.2.2.101 | | | |
| Cell Capability Container Extension FDD | O | | 9.2.2.123 | | | |
| * S-UMTS information | O | | xxx | Encoding of chiprate or scaling factor | YES | ignore |

TABLE 5b

Requested Data Value IE including the S-UMTS information IE is shown below.

| IE/Group Name | Presence | Range | IE Type and Reference | Semantics Description | Criticality | Assigned Criticality |
|---|---|---|---|---|---|---|
| UTRAN Access Point Position with Altitude | O | | 9.2.1.75 | | — | |
| IPDL Parameters | O | | 9.2.1.31F | | — | |
| DGPS Corrections | O | | 9.2.1.19B | | — | |
| GPS Navigation Model and Time Recovery | O | | 9.2.1.30I | | — | |
| GPS Ionospheric Model | O | | 9.2.1.30H | | — | |
| GPS UTC Model | O | | 9.2.1.30L | | — | |
| GPS Almanac | O | | 9.2.1.30G | | — | |
| GPS Real-Time Integrity | O | | 9.2.1.30J | | — | |
| GPS RX Pos | O | | 9.2.1.30K | | — | |
| SFN-SFN Measurement Reference Point Position | O | | 9.2.1.74 | | — | |
| Cell Capacity Class Value | O | | 9.2.1.5C | | YES | ignore |
| NACC Related Data | O | | 9.2.1.41a | | YES | ignore |
| MBMS Bearer Service Full Address | O | | 9.2.1.84 | | YES | ignore |
| Inter-frequency Cell Information | O | | 9.2.1.31G | | YES | ignore |
| GANSS Common Data | | 0 . . . 1 | | | YES | ignore |
| >GANSS Ionospheric Model | O | | 9.2.1.103 | | — | |
| >GANSS RX Pos | O | | 9.2.1.105 | | — | |
| >GANSS Additional Ionospheric Model | O | | 9.2.1.103a | | YES | Ignore |
| >GANSS Earth Orientation Parameters | O | | 9.2.1.122a | | YES | Ignore |
| GANSS Generic Data | | 0 . . . <maxNoGANSS> | | | GLOBAL | ignore |
| >GANSS ID | O | | 9.2.1.119 | | — | |
| >DGANSS Corrections | O | | 9.2.1. | | — | |
| >GANSS Navigation Model And Time Recovery | O | | 9.2.1.120 | | — | |
| >GANSS Time Model | O | | 9.2.1. | | — | |
| >GANSS UTC Model | O | | 9.2.1. | | — | |
| >GANSS Almanac | O | | 9.2.1. | | — | |
| >GANSS Real Time Integrity | O | | 9.2.1.104 | | — | |
| >GANSS Data Bit Assistance | O | | 9.2.1.118 | | — | |
| >GANSS Additional Time Models | O | | 9.2.1.a | | YES | Ignore |
| >GANSS Additional Navigation Models And Time Recovery | O | | 9.2.1.120a | | YES | Ignore |
| >GANSS Additional UTC Models | O | | 9.2.1.a | | YES | Ignore |
| >GANSS Auxiliary Information | O | | 9.2.1.122c | | YES | Ignore |
| >SBAS ID | C-GANSS-ID | | 9.2.1.122b | | YES | Ignore |
| Counting Information | O | | 9.2.2.94 | FDD only. | YES | ignore |

TABLE 5b-continued

Requested Data Value IE including the S-UMTS information IE is shown below.

| IE/Group Name | Presence | Range | IE Type and Reference | Semantics Description | Criticality | Assigned Criticality |
|---|---|---|---|---|---|---|
| Transmission Mode Information | O | | 9.2.2.95 | FDD only. | YES | ignore |
| MBMS Neighbouring Cell Information | O | | 9.2.2.96 | FDD only. | YES | ignore |
| RLC Sequence Number | O | | 9.2.2.97 | FDD only. | YES | ignore |
| ANR Cell Information | O | | 9.2.1.149 | | YES | ignore |
| Common E-RGCH Cell Information | O | | 9.2.1.156 | FDD only | YES | Ignore |
| * S-UMTS information | O | | xxx | Encoding of chiprate or scaling factor | YES | ignore |

It will now follow some specific examples regarding the indicator mentioned above under Action 203. As already mentioned, the indicator may at least implicitly indicate the chip rate used in a cell or all cells on a carrier. The indicator may depict the chip rate used in a cell or all cells on a carrier that has a relation with another cell (e.g. serving cell, serving carrier frequency, reference carrier etc). Examples of the S-UMTS indicator are:

An indicator for informing e.g. the second network node 103, the first wireless device 102 and/or the second wireless device 104, whether all cells on the same carrier (e.g. serving carrier, non-serving carrier, secondary serving carrier etc) use the same or different chip rates (or associated information e.g. scaling factor).

An indicator for informing e.g. the second network node 103, the first wireless device 102 and/or the second wireless device 104 whether serving and neighboring cells on the same carrier use the same or different chip rates; the second network node 103, the first wireless device 102 and/or the second wireless device 104 may already know chip rate of a serving cell of the first wireless device 102 and/or the second wireless device 104, e.g. from during an initial cell search.

An indicator for informing the e.g. the second network node 103, the first wireless device 102 and/or the second wireless device 104 whether certain reference cell and neighboring cells on the same carrier use the same or different chip rates. The reference cell can be specific cell such as serving cell or known (i.e. identified) neighbor cell of the applicable first wireless device 102 and/or the second wireless device 104.

The second network node 103, the first wireless device 102 and/or the second wireless device 104 may be provided S-UMTS information for at least the reference cell.

An indicator for informing the second network node 103, the first wireless device 102 and/or the second wireless device 104, whether cells on first and second carriers use the same or different signal configuration. As an example the first and second carriers may be serving carrier (e.g. secondary serving carrier) and non-serving carrier (e.g. interfrequency carrier) respectively or they can be primary serving carrier and secondary serving carrier respectively. The second network node 103, the first wireless device 102 and/or the second wireless device 104 may be provided S-UMTS information for at least the first carrier.

It may be pre-defined that if a wireless device, e.g. the first wireless device 102 or the second wireless device 104, does not receive S-UMTS information (e.g. chip rate or associated information such as based on the first chip rate information) for a cell or for all cells on a carrier then, at least when the wireless device need such information, the wireless device shall assume that a reference chip rate is used for operating signals on that cell or all cells on that carrier. The reference chip rate may be configurable or pre-defined. Examples of reference chip rate is legacy UMTS FDD chip rate (i.e. 3.84 Mcps), chip rate of a serving cell or specific serving cell such as primary serving cell in case of multicarrier operation etc.

All nodes, including e.g. the first network node 102, the second network node 103, the first wireless device 102, the second wireless device 104 and the third node 105, may not be capable of operating, e.g. receiving/transmitting data, performing measurements etc, with different chip rates. Furthermore certain nodes, e.g. all or some of the above-mentioned nodes, may be capable of operating with sub-set of all possible or available or pre-defined set of chip rates. A node, e.g. a radio network node or a wireless device such as a UE, may therefore report its capability to another network node, e.g. RNC, eNode B, BS, relay, core network node, positioning node, BSC etc, indicating that it is capable of operating with more than one chip rates e.g. 3.84 Mcps, 1.92 Mcps etc.

In the context of embodiments herein, said another network node may be the first network node 101 and/or the third network node 105. Such capability information may be comprise in the first chip rate information and/or the second chip rate information. The node may also signal additional information as part of the capability. The additional information may comprise one or more of the following:

Whether the node is capable of operating with all of pre-defined chip rates.

Whether the node is capable of operating with specific set of or with all of pre-defined chip rates on all carriers (e.g. on primary and secondary carrier frequencies) or on specific carrier (e.g. primary serving carrier frequency).

Whether the node is capable of operating with different chip rates on different carriers simultaneously e.g. with chip rate of 3.84 Mcps and 1.92 Mcps on primary and secondary carrier frequencies respectively.

Whether the node is capable of performing radio measurements (or certain radio measurements like CPICH measurements) with specific set or with all pre-defined chip rates on all carriers (e.g. on primary and secondary carrier frequencies) or on specific carrier (e.g. primary serving carrier frequency, inter-frequency carrier, inter-RAT carrier).

Whether the node is capable of performing a radio operation (e.g. radio measurements) on cells on the same carrier where cells operate using different chip rates.

The node may send the above mentioned capability information to said another network node in any of the following manners:

Proactive reporting without receiving any explicit request from the network node (e.g. serving or any target network node)

Reporting upon receiving any explicit request from the network node (e.g. serving or any target network node)

The explicit request can be sent to the node by the network anytime or at any specific occasion. For example the request for the capability reporting can be sent to the UE during initial setup or after a cell change (e.g. handover, RRC connection re-establishment, RRC connection release with redirection, PCell change in CA, PCC change in PCC etc).

Said network node (e.g. serving RNC, serving eNode B, BS, positioning node, relay, RNC, BSC etc.), such as the first network node 101 and/or the second network node 103, may use the capability information, e.g. with regard to a wireless device, e.g. the first wireless device 102 and/or the second wireless device 104, for performing one or more radio operational tasks related to measurement configuration, mobility procedure etc.

In general the network node may adapt the parameters sent in a measurement configuration to the wireless device involved, e.g. chip rate of the cell or carrier to be measured, generation of S-UMTS indicator etc. For example if the wireless device involved does not support this capability then the network node does not configure the UE to perform measurement on a carrier, which does not us the legacy chip rate of 3.84 Mcps.

The network node may also forward the capability information to other network node e.g. to neighbouring radio network node, Self Organizing Network (SON) etc. For example, the third network node 105 may forward such information comprised in the first chip rate information to the first network node 101 and/or the first network node 101 may forward such information comprised in the second chip rate information to the second network node 103. This may avoid the need for the involved wireless device to again signal its capability to e.g. a new serving radio node after a cell change e.g. after handover. In this way signalling overheads can be reduced.

One example of an IE that may contain S-UMTS capability information for cells is the so called Cell Capability Container FDD or Cell Capability Container Extension FDD. This IE may be exchanged between RNC's over the Iur interface. The RNC may use this information to configure the base stations with appropriate S-UMTS parameters sent to a wireless device for performing radio measurements on neighbouring cells and/or it may use it to configure its base stations with S-UMTS parameters under its control.

Embodiments herein enable a network node to become aware of chip rate used in different cells in the coverage area in a S-UMTS deployment scenario.

Embodiments herein enable a network node to easily generate information related to the chip rate required for a wireless device for performing radio operations e.g. measurements.

Embodiments herein enable a network node to provide more compact information related to chip rate to a wireless device.

A network node (e.g. RNC), such as any of the first network node 101 and the second network node 103, serving a wireless device (e.g. UE), such as any of the first wireless device 102 and the second wireless device 103, may acquire one or more S-UMTS related parameters (e.g. chip rate, scalability parameter to scaling chip rate with regard to reference value) used in a cell from another network node (e.g. Node B) and signals the acquired information to the wireless device in order to assist in performing one or more radio procedures (e.g. measurement, mobility etc).

In some embodiments, a method in the first network node 101 serving the first wireless device 102 may comprise:

Sending a request to the third network node 105 to send information related to S-UMTS (e.g. configuration and/or capability such as chip rate, scalability parameter etc) associated with a cell or group of cells operating on a carrier frequency.

Receiving from the third network node 105 information related to S-UMTS (e.g. chip rate) associated with the cell or group of cells operating on the carrier frequency.

The method in the first network node 101 may further comprise:

Configuring a network node (e.g. BS), such as e.g. the first network node 101 and/or the second network nod 103, with S-UMTS parameters while taking into account the received S-UMTS capability information from the third node 105.

The method in the first network node 101 may further comprise:

Signaling the obtained information related to S-UMTS (e.g. chip rate) associated with the cell or group of cells operating on the carrier frequency to the first wireless device 102 and/or the second wireless device 104.

The method in the first network node 101 may further comprise obtaining S-UMTS capability information of a wireless device, e.g. corresponding to the third node 105, proactively or in response to a request.

Figure 3:
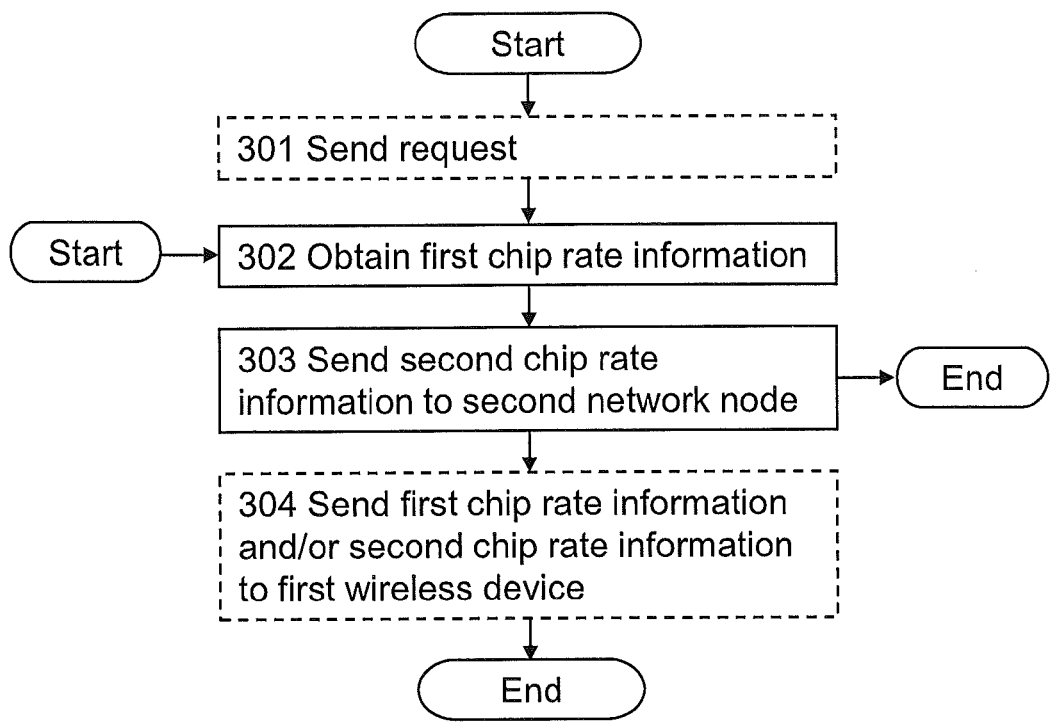
FIG. 3 is a flow chart schematically illustrating embodiments of a method, performed by a first network node, according to embodiments herein.

FIG. 3 is a flow chart schematically illustrating embodiments of a method, performed by the first network node 101, for handling information associated with one or more UMTS cells. As already mentioned, the first network node 101 is comprised in the cellular communication system 100.

The method comprises the following actions, which actions may be taken in any suitable order and/or be carried out fully or partly overlapping in time when this is possible and suitable.

Action 301

The first network node 101 may send, to the third node 105, a request requesting the third node 105 to send first chip rate information to the first network node 101. The first chip rate information is further discussed below under Actions 302 and 303.

This action may fully or partly correspond to action 201 discussed above.

Action 302

The first network node 101 obtains first chip rate information. The first chip rate information is information associated with at least one chip rate with which radio signals are operable in said one or more UMTS cells.

In some embodiments, obtain the first chip rate information comprises that the first network node 101 receives the first chip rate information from the third node 105. The first chip rate information may be received from the third node 105 in response to the sent request in Action 301.

In some embodiments, the first network node 101 is a first RNC and the third node 105 is an UMTS Node B controlled by the first RNC. In other embodiments, the first network node 101 is a first RNC and the third node is a second RNC. In yet other embodiments, the first network node 101 is an LTE eNobeB and the third node 105 is an UMTS node.

This action may fully or partly correspond to action 202 discussed above.

Action 303

The first network node 101 sends second chip rate information to the second network node 103, i.e. another network node, comprised in the cellular communications system 100. The second chip rate information is based on the obtained first chip rate information.

The first chip rate information and/or the second chip rate information may comprises one or more of the following: a chip rate of a cell or group of cells or all cells on the same carrier frequency, a scaling factor to scale chip rate of a cell or group of cells or all cells on the same carrier frequency, and a reference chip rate, or identifier of a reference chip rate, to scale the chip rate.

In some embodiments, the second chip rate information comprises information for configuring the second network node 103.

The second chip rate information may be sent to the second network node 103 for use by the second network node 103. The use may involve a wireless device, e.g. the first wireless device 102 or the second wireless device 104, which wireless device may be served or controlled or managed by the first network node 101 or the second network node 103 to execute one or more radio procedures. Said wireless device may be involved with regard to a cell that is another cell than a cell in which the wireless device is being served or controlled or managed. In some embodiments, the second network node 103 is a RNC for controlling operation of the wireless device. In some embodiments, the second network node 103 is a positioning node for configuring the wireless device to perform positioning related tasks. In some embodiments, the second network node 103 is a node for configuring the wireless device as part of a MDT configuration to log one or more parameters related to the second chip rate information. In some embodiments, the second network node 103 has a radio coverage area at least partially overlapping with a radio coverage area of the first network node 101.

This action may fully or partly correspond to action 203 discussed above.

Action 304

The first network node 101 may send at least part of the first chip rate information and/or the second chip rate information to one or more wireless devices, e.g. the first wireless device 102 and/or the second wireless device 104.

This action may fully or partly correspond to action 205 discussed above.

Figure 4:
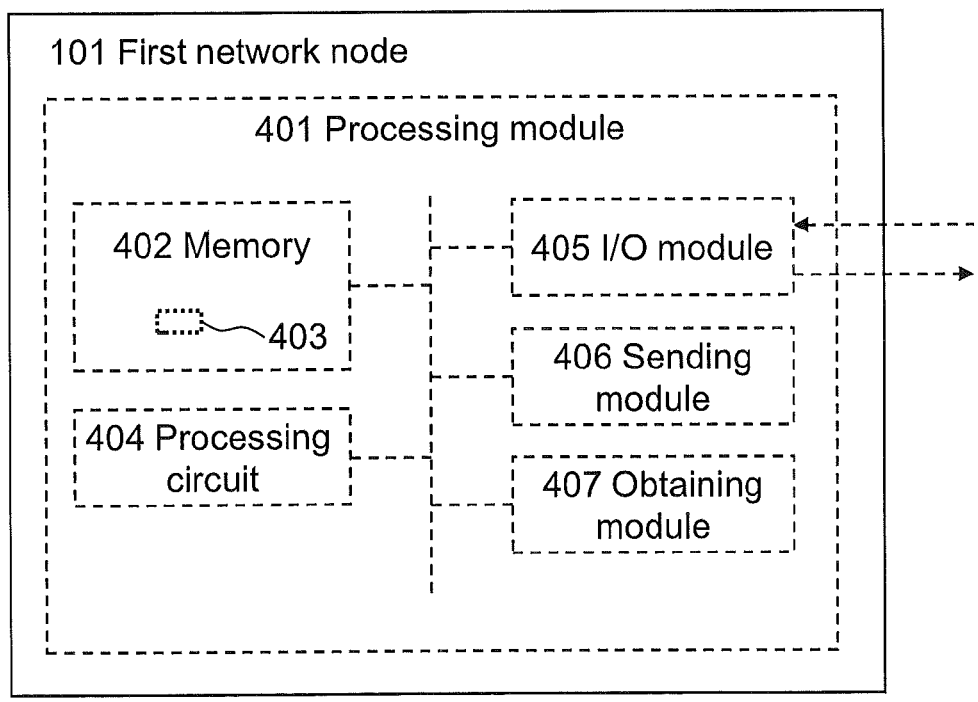
FIG. 4 is a schematic block diagram for illustrating embodiments of the first network node.

FIG. 4 is a schematic block diagram for illustrating embodiments of the first network node 101 and how the first network node 101 may be configured to perform the method actions discussed above in connection with FIG. 3.

The first network node 101 may comprise a processing module 401, such as a means, one or more hardware modules, including e.g. one or more processors, and/or one or more software modules for performing the methods described herein.

The first network node 101 may further comprise a memory 402. The memory may comprise, such as contain or store, a computer program 403. The computer program comprises 'instructions' or 'code' directly or indirectly executable by the first network node 101 so that the first radio network node 101 performs the method. The memory 402 may comprise one or more memory units. The memory 402 may further be arranged to store data, such as configurations and/or applications involved in or for performing functions and actions of embodiments herein.

According to some embodiments herein, the processing module 401 comprises, e.g. 'is embodied in the form of' or 'realized by', a processing circuit 404 as an exemplifying hardware module. The processing circuit 404 may comprise or correspond to one or more processors. In these embodiments, the memory 402 may comprise the computer program 403 executable by the processing circuit 402, whereby the first network node 101 is operative, or configured, to perform the method.

Typically the first network node 101, e.g. the processing module 401, comprises an Input/Output (I/O) module 405, configured to be involved in, e.g. by performing, any communication to and/or from other units in the cellular communication system 100, such as sending and/or receiving information to and/or from other external nodes or devices, e.g. the first network node 101 and/or the third node 105. The I/O module 405 may be exemplified by an obtaining, e.g. receiving, module and/or a sending module, when applicable, and/or a I/O unit, which I/O unit may connect to a receive unit, "Rx", (not shown) comprised in the first network node 101 and a transmit unit, "Tx", (not shown) also comprised in the first network node 101. The function of the receive unit and of the transmit unit may be controlled by means of a control unit (not shown) comprised in the first network node 101, which may use a memory unit, e.g. the memory 402, and the receive unit. The control unit may be the processing circuit 404.

In further embodiments, the first network node 101, e.g. the processing module 401, may comprise one or more of a sending module 406 and an obtaining module 407 as exemplifying hardware and/or software module(s). In some embodiments, the sending module 406 and/or the obtaining module 407 may be fully or partly implemented by the processing circuit 404.

Therefore, according to the various embodiments described above, the first network node 101 and/or the processing module 401 and/or the obtaining module 407 are operative, or configured, to obtain the first chip rate information. Being operative, or configured, to obtain the first chip rate information may comprise being operative, or configured, to receive the first chip rate information from the third node 105.

Further, the first network node 101 and/or the processing module 401 and/or the sending module 406 may be operative, or configured, to send the second chip rate information to the second network node 103.

The first network node 101 and/or the processing module 401 and/or the sending module 406 may be further operative, or configured, to send, to the third node (105), said request, and the first network node 101 and/or the processing module 401 and/or the obtaining module 407 may be further operative, or configured, to receive the first chip rate information from the third node 105 in response to the sent request.

Moreover, the first network node 101 and/or the processing module 401 and/or the sending module 406 may be operative, or configured, to send at least part of the first chip rate information and/or the second chip rate information to said one or more wireless devices, e.g. the first wireless device 102 and/or the second wireless device 104.

Furthermore, the first network node 101 and/or the processing module 401 and/or the sending module 406 may be operative, or configured, to send second chip rate for use by the second network node 103. As already mentioned above, this use involves a wireless device, e.g. the first wireless device 102 and/or the second wireless device 104, being served or controlled or managed by the first network node 101 or the second network node 103 to execute one or more radio procedures.

FIGS. 5a-c are schematic drawings illustrating embodiments relating to the computer program 403 that comprises instructions that when executed by the processing circuit 404 causes the first radio network node 101 to perform the method as described above.

In some embodiments there is provided a computer program product, i.e. a data carrier, comprising a computer-readable medium and the computer program 403 stored on the computer-readable medium. By computer readable medium may be excluded a transitory, propagating signal and the computer readable medium may correspondingly be named non-transitory computer readable medium. Non-limiting examples of the computer-readable medium is a memory card or a memory stick 501 as in FIG. 5a, a disc storage medium 502 such as a CD or DVD as in FIG. 5b, a mass storage device 503 as in FIG. 5c. The mass storage device 503 is typically based on hard drive(s) or Solid State Drive(s) (SSD). The mass storage device 503 may be such that is used for storing data accessible over a computer network 504, e.g. the Internet or a Local Area Network (LAN).

The computer program 403 may furthermore be provided as a pure computer program or comprised in a file or files. The file or files may be stored on the computer-readable medium and e.g. available through download e.g. over the computer network 504, such as from the mass storage device 503 via a server. The server may e.g. be a web or file transfer protocol (ftp) server. The file or files may e.g. be executable files for direct or indirect download to and execution on the first radio network node 101, e.g. by the processing circuit 404, or may be for intermediate download and compilation involving the same or another processor to make them executable before further download and execution causing the first network node 101 to perform the method as described above.

FIG. 6 is a flow chart schematically illustrating embodiments of a method, performed by the second network node 103, for handling information associated with one or more UMTS cells. As already mentioned, the second network node 103 is comprised in the cellular communication system 100 and may have a radio coverage area at least partially overlapping with a radio coverage area of the first network node 101.

The method comprises the following actions, which actions may be taken in any suitable order and/or be carried out fully or partly overlapping in time when this is possible and suitable.

Action 601

The second network node 103 receives second chip rate information the first network node 101, i.e. from another network node also comprised in the cellular communications system 100. The second chip rate information is based on first chip rate information being information associated with at least one chip rate with which radio signals are operable in said one or more UMTS cells.

The first chip rate information and/or the second chip rate information may comprises one or more of the following: a chip rate of a cell or group of cells or all cells on the same carrier frequency, a scaling factor to scale chip rate of a cell or group of cells or all cells on the same carrier frequency, and a reference chip rate, or identifier of a reference chip rate, to scale the chip rate.

This action may fully or partly correspond to action 203 and action 303 discussed above.

Action 602

The second network node 103 uses the received second chip rate information.

When the second network node 103 uses the received second chip rate information this may comprise that second network node 103 sends at least part of the second chip rate information to one or more wireless devices, e.g. the second wireless device 104.

In some embodiments, the second network node 103 uses the second chip rate information to configure the second network node 103.

When the second network node 103 uses the received second chip rate information this may involve a wireless device, e.g. the first wireless device 102 or the second wireless device 104, being served or controlled or managed by the first network node 101 or the second network node 103 to execute one or more radio procedures. Said wireless device may be involved with regard to a cell that is another cell than a cell in which the wireless device is being served or controlled or managed. In some embodiments, the second network node 103 is a RNC for controlling operation of the wireless device. In some embodiments, the second network node 103 is a positioning node for configuring the wireless device to perform positioning related tasks. In some embodiments, the second network node 103 is a node for configuring the wireless device as part of a MDT configuration to log one or more parameters related to the second chip rate information. In some embodiments, the second network node 103 has a radio coverage area at least partially overlapping with a radio coverage area of the first network node 101.

This action may fully or partly correspond to action 204 discussed above.

Figure 7:
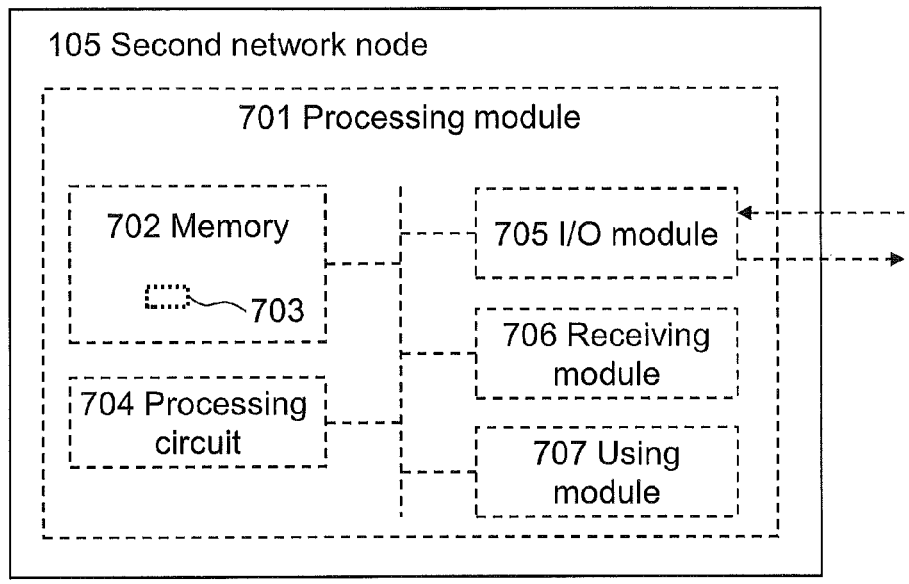
FIG. 7 is a schematic block diagram for illustrating embodiments of the second network node.

FIG. 7 is a schematic block diagram for illustrating embodiments of the second network node 103 and how the second network node 103 may be configured to perform the method actions discussed above in connection with FIG. 6.

The second network node 103 may comprise a processing module 701, such as a means, one or more hardware modules, including e.g. one or more processors, and/or one or more software modules for performing the methods described herein.

The second network node 103 may further comprise a memory 702. The memory 702 may comprise, such as contain or store, a computer program 703. The computer program comprises 'instructions' or 'code' directly or indirectly executable by the second network node 103 so that the second network node 103 performs the method. The memory 702 may comprise one or more memory units. The memory 702 may further be arranged to store data, such as configurations and/or applications involved in or for performing functions and actions of embodiments herein.

According to some embodiments herein, the processing module 701 comprises, e.g. 'is embodied in the form of' or 'realized by', a processing circuit 704 as an exemplifying hardware module. The processing circuit 704 may comprise or correspond to one or more processors. In these embodiments, the memory 702 may comprise the computer program 703 executable by the processing circuit 702, whereby the second network node 103 is operative, or configured, to perform the method.

Typically the second network node 103, e.g. the processing module 701, comprises an Input/Output (I/O) module 705, configured to be involved in, e.g. by performing, any communication to and/or from other units in the cellular communication system 100, such as sending and/or receiving information to and/or from other external nodes or devices, e.g. the first network node 101 and/or the third node 105. The I/O module 705 may be exemplified by a receiving module and/or a sending module, when applicable, and/or a I/O unit, which I/O unit may connect to a receive unit, "Rx", (not shown) comprised in the second network node 103 and a transmit unit, "Tx", (not shown) also comprised in the second network node 103. The function of the receive unit and of the transmit unit may be controlled by means of a control unit (not shown) comprised in the second network node 103, which may use a memory unit, e.g. the memory 702, and the receive unit. The control unit may be the processing circuit 704.

In further embodiments, the second network node 103, e.g. the processing module 701, may comprise one or more of a receiving module 706 and a using module 707 as exemplifying hardware and/or software module(s). In some embodiments, the receiving module 706 and/or the using module 707 may be fully or partly implemented by the processing circuit 704.

Therefore, according to the various embodiments described above, the second network node 103 and/or the processing module 701 and/or the receiving module 706 are operative, or configured, to receive the second chip rate information from the first network node 101.

Further, the second network node 103 and/or the processing module 701 and/or the using module 707 are operative, or configured, to use the received second chip rate information. For example, this may comprise that the second network node 103 and/or the processing module 701 and/or the using module 707 may be operative, or configured, to:

send at least part of the second chip rate information to one or more wireless devices, e.g. the second wireless device 104, and/or use the second chip rate information for configuring the second network node 103.

In some embodiments, said use of the received second chip rate information involves a wireless device, e.g. the first wireless device 102 or the second wireless device 104, being served or controlled or managed by the first network node 101 or the second network node 103 to execute one or more radio procedures. See Action 602 for examples of how said wireless device may be involved and in relation to different types of the second network node 103.

Figure 8A:
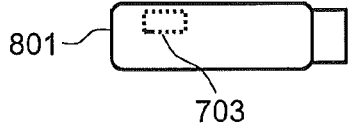
FIGS. 8a-c are schematic drawings illustrating embodiments relating to another computer program.
Figure 8B:
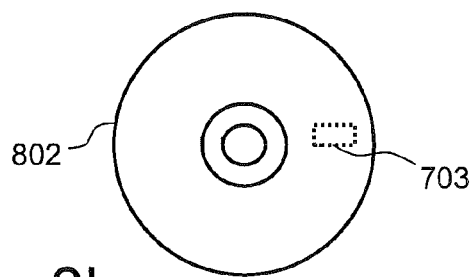
Figure 8C:
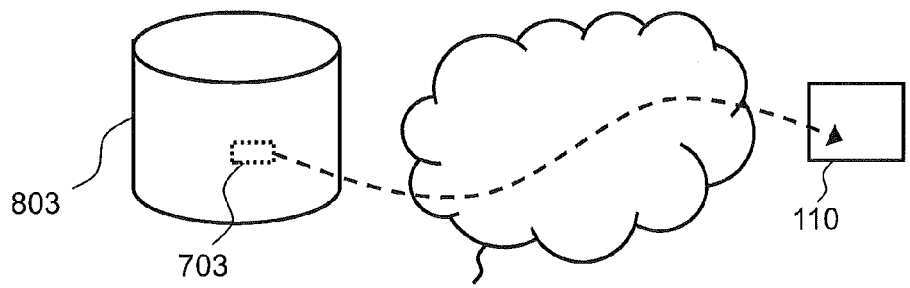

FIGS. 8a-c are schematic drawings illustrating embodiments relating to the computer program 703 that comprises instructions that when executed by the processing circuit 704 causes the second network node 103 to perform the method as described above.

In some embodiments there is provided a computer program product, i.e. a data carrier, comprising a computer-readable medium and the computer program 703 stored on the computer-readable medium. By computer readable medium may be excluded a transitory, propagating signal and the computer readable medium may correspondingly be named non-transitory computer readable medium. Non-limiting examples of the computer-readable medium is a memory card or a memory stick 801 as in FIG. 8a, a disc storage medium 802 such as a CD or DVD as in FIG. 8b, a mass storage device 803 as in FIG. 8c. The mass storage device 803 is typically based on hard drive(s) or Solid State Drive(s) (SSD). The mass storage device 803 may be such that is used for storing data accessible over a computer network 804, e.g. the Internet or a Local Area Network (LAN).

The computer program 703 may furthermore be provided as a pure computer program or comprised in a file or files. The file or files may be stored on the computer-readable medium and e.g. available through download e.g. over the computer network 804, such as from the mass storage device 803 via a server. The server may e.g. be a web or file transfer protocol (ftp) server. The file or files may e.g. be executable files for direct or indirect download to and execution on the second network node 103, e.g. by the processing circuit 704, or may be for intermediate download and compilation involving the same or another processor to make them executable before further download and execution causing the second network node 103 to perform the method as described above.

Figure 9:
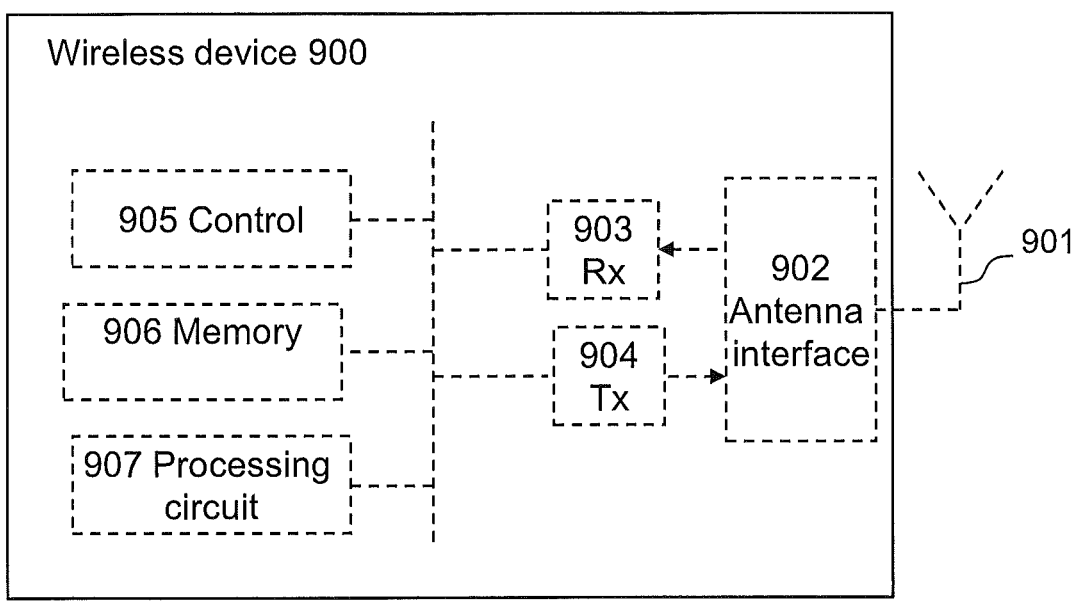
FIG. 9 is a schematic block diagram of a wireless device.

FIG. 9 shows a schematic block diagram of a wireless device 900, e.g. UE, which may correspond to any wireless device herein, e.g. any one of the first wireless device 102 and the second wireless device 104. As shown in FIG. 1, the wireless device 900 comprises an antenna unit 901 connected to an antenna interface 902. The antenna interface 902 is used to connect a receive unit ("Rx") 903 and a transmit unit ("Tx") 904 to the antenna unit 105. The function of the receive unit and of the transmit unit is controlled by means of a control unit 905, which uses a memory unit 906. The antenna unit 105, the antenna interface 110 and the receive unit 150 are used to receive information, and the antenna unit 105, the antenna interface 110 and the transmit unit 120 are used to transmit information. The memory unit 140 may be used to store information, and the control unit 130 is used, for example, to understand received information.

According to some embodiments herein, the wireless device 900 comprises a processing circuit 907 that may comprise or correspond to one or more processors. In these embodiments, the memory 402 may comprise a computer program (not shown) executable by the processing circuit 907, whereby the wireless device 900 is operative, or configured, to perform method actions relating to any wireless device herein.

Note that any processing module(s) mentioned in the foregoing may be implemented as a software and/or hardware module, e.g. in existing hardware and/or as an Application Specific integrated Circuit (ASIC), a field-programmable gate array (FPGA) or the like. Also note that any hardware module(s) and/or circuit(s) mentioned in the foregoing may e.g. be included in a single ASIC or FPGA, or be distributed among several separate hardware components, whether individually packaged or assembled into a System-on-a-Chip (SoC).

Those skilled in the art will also appreciate that the modules and circuitry discussed herein may refer to a combination of hardware modules, software modules, analog and digital circuits, and/or one or more processors configured with software and/or firmware, e.g. stored in memory, that, when executed by the one or more processors make the first radio network node 102 and/or the wireless device 110 to be configured to and/or to perform the above-described methods, respectively.

The term "network node" as used herein may as such refer to any type of radio network node (described below) or any network node, which may communicate with at least a radio network node. Examples of such network nodes include any radio network node stated above, a core network node (e.g. MSC, MME, etc.), Operations & Maintenance (O&M), Operations Support Systems (OSS), Self Organizing Network (SON) node, positioning node (e.g. E-SMLC), MDT etc.

The term "radio network node" as used herein may as such refer to any type of network node serving a wireless device, e.g. UE, and/or that are connected to other network node(s) or network element(s) or any radio node from which a wireless device, e.g. UE, receives signals. Examples of radio network nodes are Node B, base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

Each of the terms "wireless device", "user equipment" and "UE", as used herein, may refer to any type of wireless device arranged to communicate with a radio network node in a cellular or mobile communication system and may thus be referred to as a wireless communication device. Examples include: target devices, device to device UE, machine type UE or UE capable of machine to machine communication, PDA, iPAD, Tablet, mobile terminals, smart phone, laptop embedded equipped (LEE), laptop mounted equipment (LME), USB dongles etc. While said terms are used frequently herein for convenience, or in the context of examples involving other 3GPP nomenclature, it must be appreciated that the term as such is non-limiting and the teachings herein apply to essentially any type of wireless device.

The term "node" as used herein may be used for the sake of simplicity, in order to denote a node which may be a network node, a radio network node or a wireless device or UE, as applicable.

Note that although terminology used herein may be particularly associated with and/or exemplified by certain cellular communication systems, wireless communication networks etc., depending on terminology used, such as wireless communication networks based on 3GPP, this should not be seen as limiting the scope of the embodiments herein to only such certain systems, networks etc.

As used herein, the term "memory" may refer to a hard disk, a magnetic storage medium, a portable computer diskette or disc, flash memory, random access memory (RAM) or the like. Furthermore, the memory may be an internal register memory of a processor.

Also note that terminology such as first network node, second network node, first wireless device, second wireless device, etc., as such should be considering non-limiting and the terminology as such does not imply a certain hierarchical relation. Without any explicit information in the contrary, naming by enumeration should be considered merely a way of accomplishing different names.

As used herein, the expression "configured to" may mean that a processing circuit is configured to, or adapted to, by means of software or hardware configuration, perform one or more of the actions described herein.

As used herein, the terms "number", "value" may be any kind of digit, such as binary, real, imaginary or rational number or the like. Moreover, "number", "value" may be one or more characters, such as a letter or a string of letters. Also, "number", "value" may be represented by a bit string.

As used herein, the expression "in some embodiments" has been used to indicate that the features of the embodiment described may be combined with any other embodiment disclosed herein.

As used herein, the expression "transmit" and "send" are typically interchangeable. These expressions may include transmission by broadcasting, uni-casting, group-casting and the like. In this context, a transmission by broadcasting may be received and decoded by any authorized device within range. In case of uni-casting, one specifically addressed device may receive and encode the transmission. In case of group-casting, e.g. multi-casting, a group of specifically addressed devices may receive and decode the transmission.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the present disclosure, which is defined by the appending claims.

The invention claimed is:

1. A method, performed by a first network node, for handling information associated with one or more Universal Mobile Telecommunications System, "UMTS", cells, the first network node being comprised in a cellular communication system, wherein the method comprises:
   obtaining first chip rate information being information associated with at least one chip rate with which radio signals are operable in said one or more UMTS cells, and
   sending second chip rate information to another, second network node comprised in the cellular communications system, which second chip rate information is based on the obtained first chip rate information.

2. The method as claimed in claim 1, wherein the first chip rate information and/or the second chip rate information comprises one or more of the following:
   a chip rate of a cell or group of cells or all cells on the same carrier frequency,
   a scaling factor to scale chip rate of a cell or group of cells or all cells on the same carrier frequency, and
   a reference chip rate, or identifier of a reference chip rate, to scale the chip rate.

3. The method as claimed in claim 1, wherein the method further comprises:
   sending at least part of the first chip rate information and/or the second chip rate information to one or more wireless devices.

4. The method as claimed in claim 1, wherein the second chip rate information comprises information for configuring the second network node.

5. The method as claimed in claim 1, wherein the second chip rate information is sent for use by the second network node, which use involves a wireless device being served or controlled or managed by the first network node or the second network node to execute one or more radio procedures.

6. The method as claimed in claim 5, wherein the wireless device is involved with regard to a cell that is another cell than a cell in which the wireless device is being served or controlled or managed.

7. The method as claimed in claim 5, wherein the second network node has a radio coverage area at least partially overlapping with a radio coverage area of the first network node.

8. The method as claimed in claim 5, wherein the second network node is a Radio Network Controller, "RNC", for controlling operation of the wireless device.

9. The method as claimed in claim 5, wherein the second network node is a positioning node for configuring the wireless device to perform positioning related tasks.

10. The method as claimed in claim 5, wherein the second network node is a node for configuring the wireless device as part of a Minimization of Drive Test, "MDT", configuration to log one or more parameters related to the second chip rate information.

11. The method as claimed in claim 1, wherein obtaining the first chip rate information comprises receiving the first chip rate information from a third node.

12. The method as claimed in claim 11, wherein the method further comprises:
sending, to the third node, a request requesting the third node to send the first chip rate information to the first network node, wherein the first chip rate information is received from the third node in response to the sent request.

13. The method as claimed in claim 11, wherein the first network node is a first RNC and the third node is an UMTS Node B controlled by the first RNC, or the first network node is a first RNC and the third node is a second RNC, or the first network node is an LTE eNobeB and the third node is an UMTS node.

14. A computer program comprising instructions that when executed by a processing circuit causes the first network node to perform the method according to claim 1.

15. A computer program product comprising a computer-readable medium storing the computer program according to claim 14.

16. A method, performed by a second network node, for handling information associated with one or more Universal Mobile Telecommunications System, "UMTS", cells, the second network node being comprised in a cellular communication system, wherein the method comprises:
receiving second chip rate information from another, first network node comprised in the cellular communications system, which second chip rate information is based on first chip rate information being information associated with at least one chip rate with which radio signals are operable in said one or more UMTS cells, and
using the received second chip rate information for operation of the second network node.

17. The method as claimed in claim 16, wherein the first chip rate information and/or the second chip rate information comprises one or more of the following:
a chip rate of a cell or group of cells or all cells on the same carrier frequency,
a scaling factor to scale chip rate of a cell or group of cells or all cells on the same carrier frequency, and
a reference chip rate, or identifier of a reference chip rate, to scale the chip rate.

18. The method as claimed in claim 16, wherein using the received second chip rate information comprises sending at least part of the second chip rate information to one or more wireless devices.

19. The method as claimed in claim 16, wherein the second network node is using the second chip rate information for configuring the second network node.

20. The method as claimed in claim 16, wherein the second network node has a radio coverage area at least partially overlapping with a radio coverage area of the first network node.

21. The method as claimed in claim 16, wherein using the received second chip rate information involves a wireless device being served or controlled or managed by the first network node or the second network node to execute one or more radio procedures.

22. The method as claimed in claim 21, wherein the wireless device is involved with regard to a cell that is another cell than a cell in which the wireless device is being served or controlled or managed.

23. The method as claimed in claim 21, wherein the second network node is a Radio Network Controller, "RNC", controlling operation of the wireless device.

24. The method as claimed in claim 21, wherein the second network node is a positioning node for configuring the wireless device to perform positioning related tasks.

25. The method as claimed in claim 21, wherein the second network node is a node for configuring the wireless device as part of a Minimization of Drive Test, "MDT", configuration to log one or more parameters related to the second chip rate information.

26. A computer program comprising instructions that when executed by a processing circuit causes second network node to perform the method according to claim 16.

27. A computer program product comprising a computer-readable medium storing a computer program according to claim 26.

28. A first network node for handling information associated with one or more Universal Mobile Telecommunications System, "UMTS", cells, the first network node being comprised in a cellular communication system, wherein the first network node is configured to:
obtain first chip rate information being information associated with at least one chip rate with which radio signals are operable in said one or more UMTS cells, and
send second chip rate information to another, second network node comprised in the cellular communications system, which second chip rate information is based on the obtained first chip rate information.

29. The first network node as claimed in claim 28, wherein the first chip rate information and/or the second chip rate information comprises one or more of the following:
a chip rate of a cell or group of cells or all cells on the same carrier frequency,
a scaling factor to scale chip rate of a cell or group of cells or all cells on the same carrier frequency, and
a reference chip rate, or identifier of a reference chip rate, to scale the chip rate.

30. The first network node as claimed in claim 28, wherein the first network node is further configured to send at least part of the first chip rate information and/or the second chip rate information to one or more wireless devices.

31. The first network node as claimed in claim 28, wherein the second chip rate information comprises information for configuring the second network node.

32. The first network node as claimed in claim 28, wherein the first network node is configured to send the second chip rate for use by the second network node, which use involves a wireless device being served or controlled or managed by the first network node or the second network node to execute one or more radio procedures.

33. The first network node as claimed in claim 32, wherein the wireless device is involved with regard to a cell that is another cell than a cell in which the wireless device is being served or controlled or managed.

34. The first network node as claimed in claim 32, wherein the second network node has a radio coverage area at least partially overlapping with a radio coverage area of the first network node.

35. The first network node as claimed in claim 32, wherein the second network node is a Radio Network Controller, "RNC", for controlling operation of the wireless device.

36. The first network node as claimed in claim 32, wherein the second network node is a positioning node for configuring the wireless device to perform positioning related tasks.

37. The first network node as claimed in claim 32, wherein the second network node is a node for configuring the wireless device as part of a Minimization of Drive Test, "MDT", configuration to log one or more parameters related to the second chip rate information.

38. The first network node as claimed in claim 28, wherein configured to obtain the first chip rate information comprises configured to receive the first chip rate information from a third node.

39. The first network node as claimed in claim 38, wherein the first network node is further configured to send, to the third node, a request requesting the third node to send the first chip rate information to the first network node, wherein the first network node is configured to receive the first chip rate information from the third node in response to the sent request.

40. The first network node as claimed in claim 38, wherein the first network node is a first RNC and the third node is an UMTS Node B controlled by the first RNC, or the first network node is a first RNC and the third node is a second RNC, or the first network node is an LTE eNobeB and the third node) is an UMTS node.

41. A second network node for handling information associated with one or more Universal Mobile Telecommunications System, "UMTS", cells, the second network node being comprised in a cellular communication system, wherein the second network node is configured to:

receive second chip rate information from another, first network node) comprised in the cellular communications system, which second chip rate information is based on first chip rate information being information associated with at least one chip rate with which radio signals are operable in said one or more UMTS cells, and use the received second chip rate information for operation of the second network node.

42. The second network node as claimed in claim 41, wherein the first chip rate information and/or the second chip rate information comprises one or more of the following:

a chip rate of a cell or group of cells or all cells on the same carrier frequency, a scaling factor to scale chip rate of a cell or group of cells or all cells on the same carrier frequency, and a reference chip rate, or identifier of a reference chip rate, to scale the chip rate.

43. The second network node as claimed in claim 41, wherein said use of the received second chip rate information comprises to send at least part of the second chip rate information to one or more wireless devices.

44. The second network node as claimed in claim 41, wherein the second network node is configured to use the second chip rate information for configuring the second network node.

45. The second network node as claimed in claim 41, wherein the second network node has a radio coverage area at least partially overlapping with a radio coverage area of the first network node.

46. The second network node as claimed in claim 41, wherein said use of the received second chip rate information involves a wireless device being served or controlled or managed by the first network node or the second network node to execute one or more radio procedures.

47. The second network node as claimed in claim 46, wherein the wireless device is involved with regard to a cell that is another cell than a cell in which the wireless device is being served or controlled or managed.

48. The second network node as claimed in claim 46, wherein the second network node is a Radio Network Controller, "RNC", controlling operation of the wireless device.

49. The second network node as claimed in claim 46, wherein the second network node is a positioning node for configuring the wireless device to perform positioning related tasks.

50. The second network node as claimed in claim 46, wherein the second network node is a node for configuring the wireless device as part of a Minimization of Drive Test, "MDT", configuration to log one or more parameters related to the second chip rate information.

* * * * *